United States Patent
Fujimoto et al.

(10) Patent No.: US 6,204,867 B1
(45) Date of Patent: Mar. 20, 2001

(54) COLOR IMAGE FORMING APPARATUS HAVING LASER SCANNER CONTROL MEANS

(75) Inventors: Osamu Fujimoto; Ayuma Oda, both of Yamatokoriyama; Syoichiro Yoshiura, Tenri; Nobuo Manabe, Yamatokoriyama; Toshio Yamanaka, Yao, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/129,556

(22) Filed: Aug. 5, 1998

(30) Foreign Application Priority Data

Aug. 5, 1997 (JP) .................................... 9-210713
Aug. 15, 1997 (JP) .................................... 9-220509

(51) Int. Cl.$^7$ .................................................. G03L 15/01
(52) U.S. Cl. ........................................ 347/118; 399/299
(58) Field of Search .......................... 347/115, 118, 347/129, 232; 399/799, 82

(56) References Cited

U.S. PATENT DOCUMENTS

| 4,893,179 | * | 1/1990 | Ito ........................................ 358/529 |
| 4,949,124 | * | 8/1990 | Kusumoto et al. .................... 399/28 |
| 5,010,372 | | 4/1991 | Kasahara et al. ..................... 355/313 |
| 5,264,870 | | 11/1993 | Egawa ................................. 346/108 |
| 5,583,667 | | 12/1996 | Yamada ................................ 358/529 |

FOREIGN PATENT DOCUMENTS

| 3712587A1 | 10/1987 | (DE) . |
| 56-9624 | 1/1984 | (JP) . |
| 04290381 | 10/1992 | (JP) . |
| 05330130 | 12/1993 | (JP) . |
| 09107445 | 4/1997 | (JP) . |
| 09160335 | 6/1997 | (JP) . |

* cited by examiner

Primary Examiner—Joan Pendegrass
(74) Attorney, Agent, or Firm—Dike, Bronstein, Roberts & Cushman, LLP; David G. Conlin; David A. Tucker

(57) ABSTRACT

The image processing circuit essentially includes an image data input portion, an image processing portion, an image data output portion, an image memory composed of a hard disk drive etc., a central processing unit (CUP), an image editing portion, an external interface portion. Based on the determination result of the laser recording status determination by the CPU, an LCU also serving as a mirror motor control device, stops or retards the drives of driving motors, one by one, in the order of their completion of laser recording. The image processing circuit may further has a mode manager for checking the usage frequencies of the first most processing mode in which the input image information is image processed as color image information and the second processing mode in which the input image information is processed as monochrome image information. Moreover, the image processing portion may further has an original discriminating portion for determining the color type of an original.

6 Claims, 19 Drawing Sheets

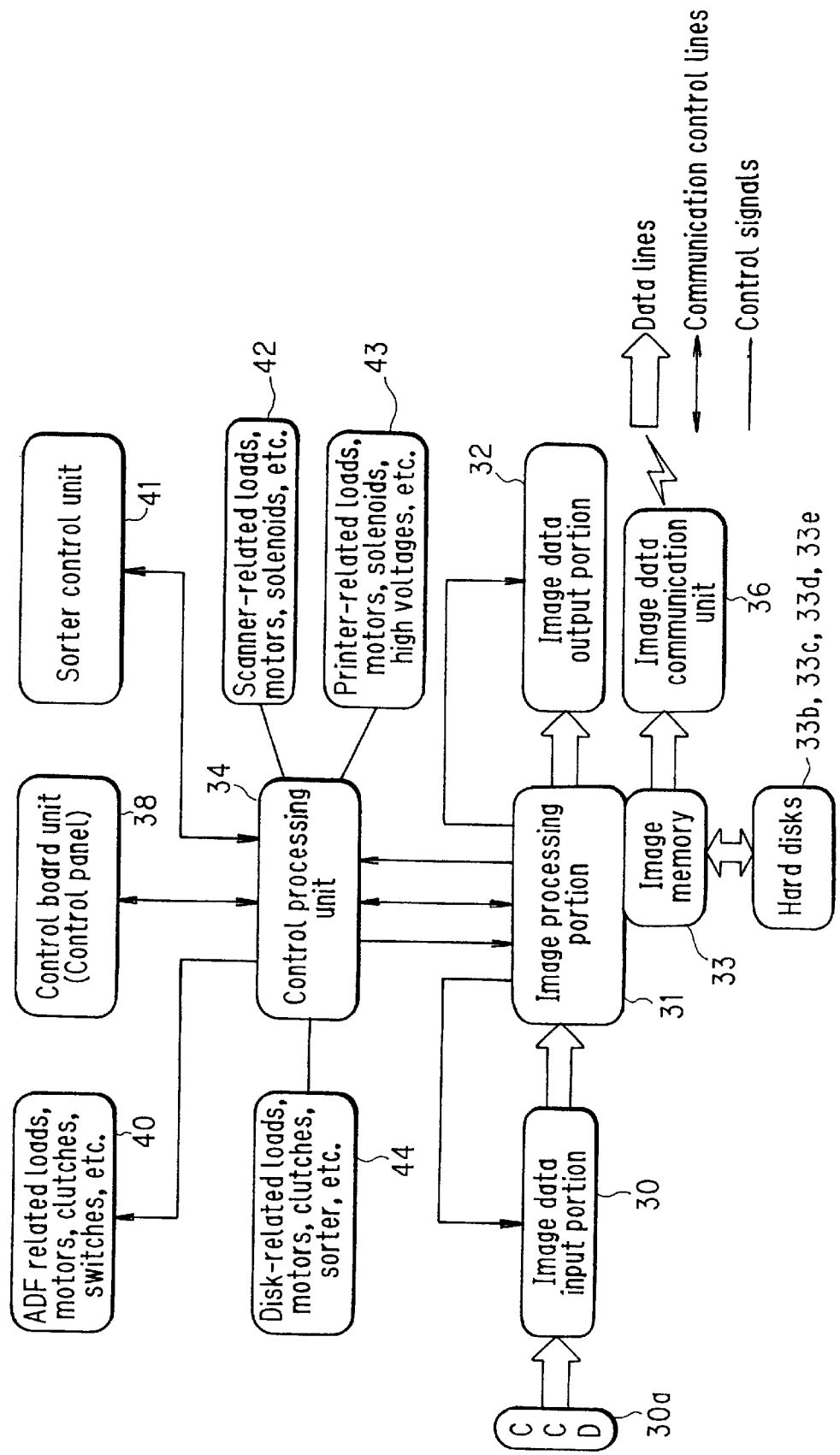

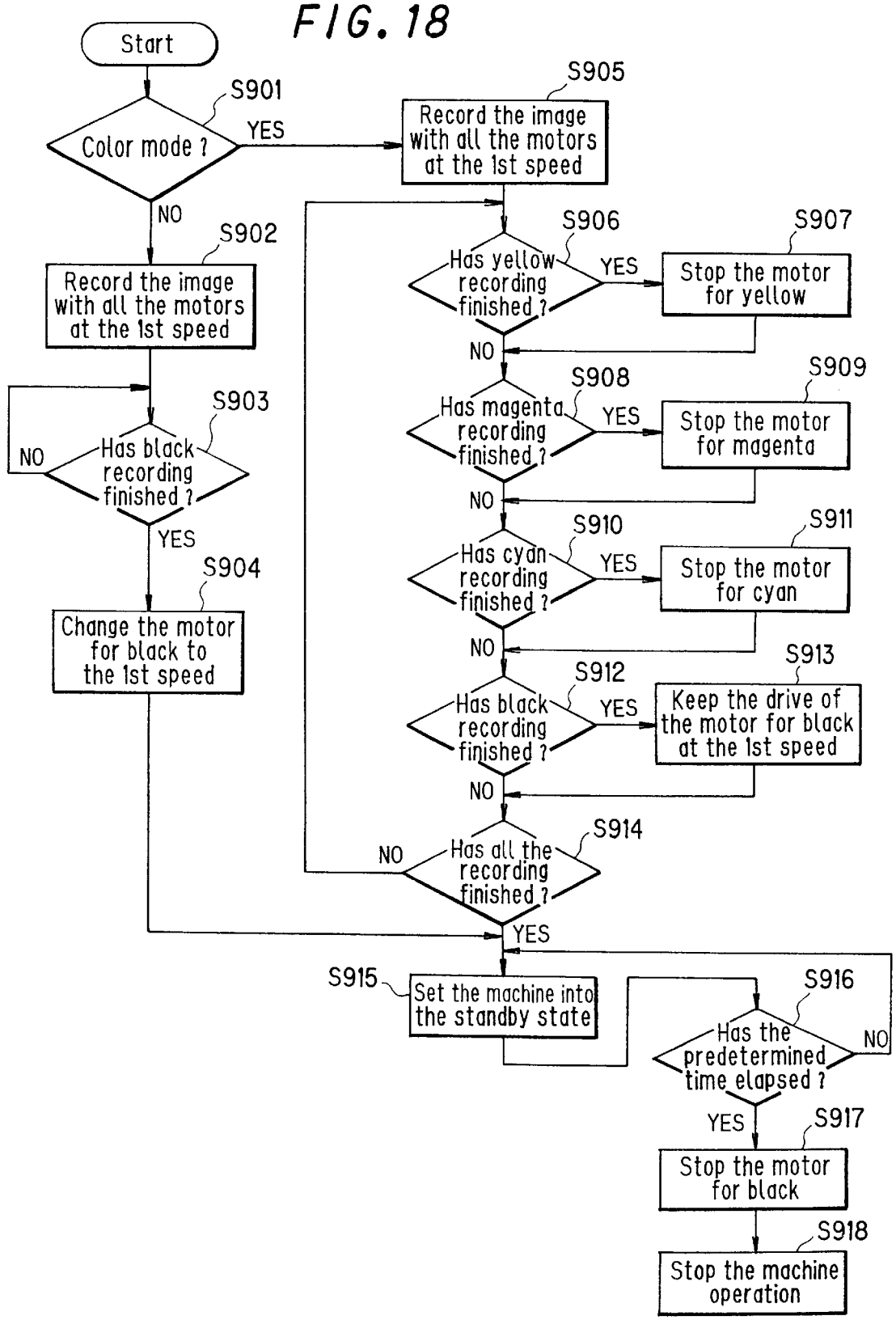

COLOR IMAGE FORMING APPARATUS HAVING LASER SCANNER CONTROL MEANS

BACKGROUND OF THE INVENTION (1) Field of the Invention

The present invention relates to a color image forming apparatus of a laser scanning type wherein multiple laser scanning units are used to form color images based on a color digital image signal.

(2) Description of the Prior Art

In a color image forming apparatus, for example, in a color digital copier, the image of a color original input through its scanner is subjected to predetermined image processings and the image data which has been obtained by separating the input image into its color components and color conversion thereof, is reproduced for each of the colors so that the color printer portion produces a reproduced image of the color original. Further, recently, in order to achieve high-speed reproduction of color images at high resolution, color digital copiers which incorporate an image forming apparatus employing laser scan recording technology have been put on the market.

In these color digital copiers, multiple laser deflection scanning units are provided for individual recording portions so that the laser beam for each color, being modulated in accordance with the digital image signal, is brought to sweep the corresponding photoreceptor, thus forming a static latent image for image forming. Such a laser deflection scanning unit mainly comprises a polygonal mirror and a motor for driving the polygonal mirror at a high speed of rotation.

However, in this color digital copier, the polygonal mirrors in the laser deflection scanning units are driven at high speed, which causes problems with respect to the motor's life and the problem of whirring due to air-turbulence caused by polygonal mirror rotating etc.

To solve these problems, it is disclosed in Japanese Patent Publication Hei 4 No. 49,688, that when laser recording is not effected, the motors for rotating the polygonal mirrors are retarded to a slower speed than when it is in operation or the motors are spun down with the drive of the motor completely stopped. However, in this configuration, the motors need to be controlled so as to completely recover the predetermined speed of rotation in a short period of time, in order to activate the laser recording portions, to revert from the waiting state back to the operating state in which the laser recording portions can effect image recording.

Further, in recent color digital copiers, a recording portion for black (BK) is generally provided in addition to Y(yellow), M(magenta) and C(cyan) recording portions in order to improve black reproduction and hence enhance the total color reproducibility of the color image. Therefore, color digital copiers have been put on the market which have the monochrome mode other than the color mode so as to allow for monochrome copying as well as color copying.

Also in a digital color copier of this type, if all the mirror-driving motors of the laser deflection scanning units in the recording portions are designed to rotate whenever a copying operation is to be done regardless of the mode, either color or monochrome mode, the mirror-driving motors for color will be also driven even in the monochrome mode. Resultantly, the problem of the life of the mirror-driving motors and their noise problem still remain unsolved.

SUMMARY OF THE INVENTION

It is therefore an object of the present invention to provide a color image forming apparatus in which the life of the mirror-driving motors is extended and the problems of their noise and wasted power consumption are reduced. Further, the operational efficiency of the color image forming apparatus is improved by reducing the acquisition time of the first copy.

The color image forming apparatus of the present invention achieves these and other objects by the provision of configurations of elements having the following aspects. The advantages of each of these aspects will appear more fully below.

In accordance with the first aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

Finally, the color image forming apparatus further includes image discrimination means for detecting the color type of the image information input through the image information input means.

It is a first feature of the invention that in the combination of elements just described the laser scan control means, based upon the result determined by the image discrimination means, controls the drive of the driving motor in each laser scanning unit in accordance with the component color to be used.

In accordance with the second aspect of the invention, the color image forming apparatus having the above first feature also includes a second feature having two parts. Specifically, the image discriminating means determines whether the image is of color or monochrome from the image information input through the image information input means. In addition, the laser scan control means performs control so that the driving motors of the laser scanner units for recording color images are stopped or retarded when the image discriminating means has determined that the original image is a monochrome image.

In accordance with the third aspect of the invention, the color image forming apparatus having the above first feature also includes a third feature having two parts. Specifically, the image discriminating means determines whether the image is of color or monochrome from the image information input through the image information input means. In addition, the laser scan control means performs control so that the driving motor other than those of the laser scanner units for recording color images is rotated in the predetermined condition.

In accordance with the fourth aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

Finally, the color image forming apparatus further includes mode managing means for checking usage-frequencies of processing modes implemented by the apparatus in the past. The processing modes include a first processing mode in which the image information input through the image information input means is processed as color image information, and a second processing mode in which the image information is processed as monochrome image information.

It is a fourth feature of the invention that in the combination of elements just described when the image forming means performs image forming, the laser scan control means, based upon the usage-frequencies of the processing modes managed by the mode managing means, controls the drive of the driving motor in each scanning unit according to predetermined conditions.

In accordance with the fifth aspect of the invention, the color image forming apparatus having the above fourth feature also includes a fifth feature. Specifically, the mode managing means checks processing mode usage-frequencies of a predetermined number of recent operations implemented in the past.

In accordance with the sixth and seventh aspects of the invention, the color image forming apparatus having the above fourth or fifth feature also includes sixth or seventh features, respectively. Specifically, the image information input means is composed of a plurality of input devices; the mode managing means controls the processing modes for each image information input device; and upon image forming, the laser scan control means controls the driving motors based on the usage-frequencies of the processing modes in the selected image information input device.

In accordance with the eighth aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motor such that laser scanning may be performed in accordance with input image information also are included in the color image forming apparatus. In addition, image forming means having a plurality of image forming units for the respective component colors of the input image information are provided. These image forming units are arranged in paralled with each other such that each image forming unit may form an image from the latent image recorded on the photoreceptor by the corresponding laser scanning unit.

It is an eighth feature of the invention that in the combination of elements just described, when an image is formed from the image information by the image forming means, the laser scan control means controls a driving motor other than those in the laser scanning units in a predetermined manner.

In accordance with the ninth aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

Finally, the color image forming apparatus further includes selecting means for selecting a processing mode from a first processing mode and the second processing mode. In the first processing mode the input image information is processed as color image information. In the second processing mode, on the other hand, the input image information is processed as monochrome image information.

It is a ninth feature of the invention that in the combination of elements just described based upon the processing mode selected, the laser scan control means controls the drives of the driving motors in the laser recording means under predetermined conditions.

In accordance with the tenth aspect of the invention, the color image forming apparatus having the above ninth feature also includes a tenth feature. Specifically, when the second processing mode is selected by the selecting means, the driving motors in the laser scanner units for recording color images are stopped or retarded by the laser scan control means.

In accordance with the eleventh aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

Finally, a laser recording status determining means also is provided for determining the recording status of the laser recording means onto the photoreceptors.

It is an eleventh feature of the invention that in the combination of elements just described the laser scan control means, based upon the determined result from the laser recording status determining means, stops or retards the drives of the driving motors, one by one when laser recording has been completed.

In accordance with the twelfth aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

Finally, the color image forming apparatus further includes laser recording status determining means for determining the recording status of the laser recording means onto the photoreceptors.

It is a twelfth feature of the invention that in the combination of elements just described, the laser scanner units are grouped into a first laser scanner section and a second laser scanner section. The ones of the laser scanner units grouped into each of these sections are controlled by the laser scan control means based upon the determined result from the laser recording status determination means. Specifically, this control is such that the drives of the driving motors in the first laser scanner section are stopped or retarded, one by one, when laser recording has been completed. On the other hand, the drive of the driving motor of the laser scanners in the second section thereof is kept rotating or is retarded to a predetermined speed of rotation even after laser recording has been completed.

In accordance with the thirteenth aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

Finally, the color image forming apparatus further includes laser recording status determining means for determining the recording status of the laser recording means onto the photoreceptors.

It is a thirteenth feature of the invention that in the combination of elements just described the laser recording means and the image forming means constitute a color recording section for recording color images and a monochrome recording section for recording monochrome images. This is accomplished by the laser recording status determining means determining the recording status of the color recording section and the recording status of the monochrome recording section, separately. The laser recording status determining means then stops the drives of the driving motors in the laser scanner units in the color recording section or retards the drives thereof to a predetermined speed of rotation prior to the control of the driving motor in monochrome recording section.

In accordance with the fourteenth aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

It is a fourteenth feature of the invention that in the combination of elements just described the laser recording means and the image forming means constitute a color recording section for recording color images and a monochrome recording section for recording monochrome images. The laser scan control means controls the drives of the drive motors in the laser scanning units in the color recording section between a first speed that allows for image recording and the stationary state. The laser scan control means also controls the drive of the drive motor in the laser scanner unit of the monochrome recording section between a first speed allowing for image recording, a second speed for standby and a stationary state.

In accordance with the fifteenth aspect of the invention, the color image forming apparatus includes image information input means for inputting image information. The apparatus also includes a laser recording means having a plurality of laser scanning units corresponding to the component colors of the input image information. The scanner units are arranged in parallel with one another. In addition, each scanner unit includes a laser, a rotational polygonal mirror and a drive motor for driving the rotational polygonal mirror.

Laser scan control means for governing the drives of the drive motors such that laser scanning may be performed in accordance with input image information also are included in the color image forming apparatus. In addition, image forming means having a plurality of image forming units for the respective component colors of the input image information are provided. These image forming units are arranged in parallel with each other such that each image forming unit may form an image from the latent image recorded on the photoreceptor by the corresponding laser scanning unit.

It is a fifteenth feature of the invention that in the combination of elements just described the laser recording means and the image forming means constitute a color recording section for recording color images and a monochrome recording section for recording monochrome images. The laser scan control means controls the drives of the drive motors in the laser scanning units in the color recording section between a first speed that allows for image recording and the stationary state. The laser scan control means also controls the drive of the drive motor in the laser scanner unit of the monochrome recording section between a first speed allowing for recording of color images and standby, a second speed allowing for monochrome recording and a stationary state.

In accordance with the sixteenth aspect of the invention, the color image forming apparatus having the above fifteenth feature also includes a sixteenth feature. Specifically, as to the driving motor of the laser scanner unit in the monochrome recording section, the first speed is slower than the second speed.

In accordance with the first feature of the invention, since the drives of the driving motors in the laser scanner units are controlled in accordance with the type of the input image, the features of the image, i.e., original, etc., are automatically extracted from the input image data captured by the input device such as a scanner. Accordingly, only the motor or motors in the laser scanner units required for forming the image are driven. This thereby makes it possible to make the copier ready within a short time. Therefore, the first-copy acquisition time can be shortened. Also, it is possible to avoid unnecessary driving of the motors in the laser scanner units which will not be engaged in recording the input image. Thus, reduction of the life of the motors and/or problems of noise and wasted power consumption can be prevented.

In accordance with the second feature of the invention, in the state where all the driving motors in the laser recording devices arranged in parallel to each other are rotating, if the original is judged to be of a monochrome type, the motors in the laser scanner units for color will be stopped or retarded. Accordingly, it is possible to avoid unnecessary driving of the motors in the color laser scanner units which will not be engaged in recording the image. Hence, reduction of the life of the motors and/or problems of noise and wasted power consumption can be prevented.

In accordance with the third feature of the invention, in the state where all the driving motors in the laser recording devices arranged in parallel to each other are in the static state, if the original is judged to be a monochrome type, the driving motors other than those in the color laser scanners will be activated. Thus, only the driving motor of the monochrome recording section required for recording the image will be activated with the driving motors for color laser scanners kept static. Thus, it is possible to prevent reduction of the life of the motors and/or problems of noise and wasted power consumption.

In accordance with the fourth feature of the invention, the mode in which the apparatus has been used most frequently is taken into account and. When the machine is activated, the driving motor or motors are started to rotate so that recording can be implemented in the most frequently used mode. Accordingly, when a copying operation is made in a mode coinciding with the most frequently used processing mode, this configuration is advantageous in reducing the waiting time before recording.

In accordance with the fifth feature of the invention, the modes in which the apparatus has been used in the last predetermined number of operations, for example, in the recent several times of operation, are taken into account. When the machine is operated, the driving motors are driven in the processing mode which has recently been used most frequently. Accordingly, the probability that the operation is performed in the most frequently used mode within the recent operations is high. This configuration is effective in reducing the waiting time before recording when an image is formed in the same processing mode.

In accordance with the sixth and seventh features of the invention, since the mode managing means is provided to control the usage frequencies of the processing modes for each of a plurality of image information input devices, it is possible to control the apparatus in such a manner that the driving motor or motors which are likely to be used will be driven. Therefore, this configuration is effective in reducing the waiting time before image forming.

In accordance with the eighth feature of the invention, since the driving motor or motors other than color laser scanners are driven, this configuration is effective in reducing the waiting time before recording when recording is performed in the monochrome recording mode which is most likely to be used, as well as in reducing noise.

In accordance with the ninth feature of the invention, since the drives of the motors are controlled in accordance with the processing mode selected through the selector means by the user, only the motor or motors in the laser scanners required for the selected image forming are controlled so as to rotate at the predetermined speed. Accordingly, it is possible not only to reduce the waiting time, but also prevent wasted driving of the driving motors. Hence, it is possible to prevent reduction of the life of the motors and/or problems of noise and wasted power consumption.

In accordance with the tenth feature of the invention, when the monochrome mode is set by the selector means, the driving motors in the laser scanners for color are stopped. Accordingly, it is possible to prevent waste driving of the motors in the laser scanners for color which are not required for the image recording in that mode. Thus, it is possible to extend the life of the motors as well as reduce noise and power consumption.

In accordance with the eleventh feature of the invention, the driving motors of the laser scanners are stopped or retarded one by one right after laser recording of image information in each laser scanner has been completed. Thus, this configuration is advantageous to the life of the motors. Additionally, this feature allows the use of low-cost driving motors. It is also possible to reduce noise and wasted power consumption.

In accordance with the twelfth feature of the invention, the driving motors of the laser scanners are stopped or retarded one by one right after laser recording of image information in each laser scanner has been completed and the driving motor in the particular laser scanner is kept rotating or retarded to the predetermined speed of rotation. Thus, this configuration is advantageous to the life of the motors. Particularly, it is possible to use low cost driving motors for the driving motors other than that of the particular laser scanner. Further, it is also possible to reduce noise and wasted power consumption.

It is further possible to reduce the acquisition time of the first copy in the copy mode in which only the particular laser scanner is used.

In accordance with the thirteenth feature of the invention, of the driving motors in the laser scanner units of the recording sections arranged in parallel to each other, the driving motors for color recording are stopped or retarded to the predetermined speed of rotation prior to the control of the driving motor for monochrome recording. Accordingly, it is possible to avoid wasted driving of the driving motors in the laser scanners in the color recording section. This allows the use of low cost driving motors for the more numerous motors present in the color image forming apparatus. Further, it is also possible to reduce noise and wasted power consumption.

In accordance with the fourteenth feature of the invention, in the configuration in which multiple laser scanners are arranged in parallel to each other, the drives of the driving motors for color recording are controlled between the first speed allowing for image recording and the stationary state while the drive of the driving motor in the monochrome recording section is controlled between the first speed allowing for image recording, the second speed for standby and the stationary state. Accordingly, it is possible to avoid wasted driving of the driving motors in the laser scanner units of the color recording section. Therefore, it becomes possible to use low cost driving motors for the more numerous motors. It is also possible to reduce noise and wasted power consumption.

In accordance with the fifteenth feature of the invention, in the configuration in which multiple laser scanners are arranged in parallel to each other, the drive of the driving motor in the monochrome recording section is controlled between the first speed for recording of color images and for standby, the second speed for recording of monochrome images and the stationary state. The drive of the driving motors for the color recording section is controlled between the first speed allowing for color image recording and the stationary state. As a result, while the driving motors of the color recording section perform color image recording, the driving motor in the monochrome recording section is also driven at the first speed and may also perform recording depending on the particular circumstances present. When only monochrome recording is performed, only the driving motor in the monochrome recording section is driven at the second speed. During the waiting state, only the driving motor of the monochrome recording section is driven at the first speed while the driving motors unrelated to the recording are made static. Thus, it is possible to avoid wasted driving of the driving motors in the laser scanner units of the color recording section for color recording. Hence, it becomes possible to use low cost driving motors for the more numerous motors in the color recording section. Further, it is also possible to reduce noise and wasted power consumption.

The sixteenth feature of the invention is apparent in the fifteenth aspect of the invention in which the first speed is slower than the second speed. Accordingly, it is possible to reduce the acquisition time of the first copy in the copy mode in which only the laser scanner in the monochrome recording section is used. Thus, it is possible to markedly improve the usability in the monochrome copy mode which records at a higher rate and is used more frequently.

BRIEF DESCRIPTION OF THE DRAWINGS

FIG. 3 is a block diagram showing the configuration of the operations controlled by the CPU in the digital color copier shown in FIG. 1;

FIG. 18 is a flowchart showing the operation of the fourteenth embodiment of a digital color copier.

DESCRIPTION OF THE PREFERRED EMBODIMENTS

The embodiments of the invention will hereinafter be described with reference to the accompanying drawings.

(Configuration of the color digital copier)

Figure 1:
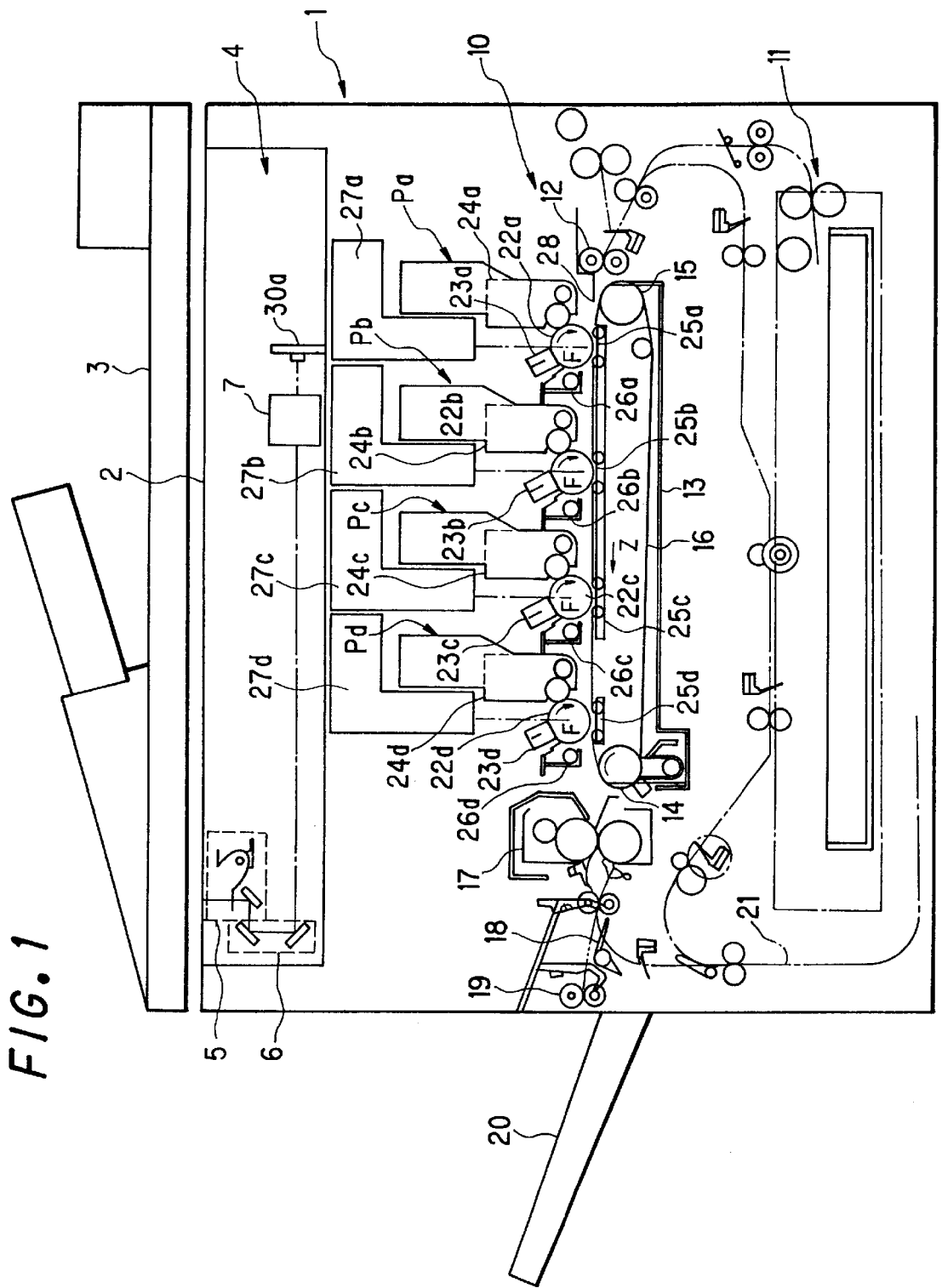
FIG. 1 is a front sectional view showing the configuration of a digital color copier in accordance with an embodiment of the invention.

FIG. 1 is an overall front sectional view showing the configuration of a digital color copier as the image forming apparatus of the invention. Provided on the top of a copier body 1 are an original table 2 and a control panel while an automatic document feeder 3 is mounted on the top of original table 2. The automatic document feeder 3 is positioned with the predetermined relationship relative to the surface of original table 2 and supported so as to be opened and closed relative to original table 2. Further, copier body 1 incorporates an original scanner 4 as the image reading portion and an image forming portion 10.

First, automatic document feeder 3 is mounted over original table 2, i.e., on the top of copier body 1. This feeder is a reversing automatic document feeder 3 capable of handling double-sided originals. An original is fed so that one side thereof opposes original table 2 at the predetermined position. After completion of reading the image on one side, the original is inverted and fed so that the other side opposes original table 2 at the predetermined position.

When the images on both sides of one original have been captured, this original is discharged and the duplex feeding operation of the next original will be effected. The operations of feeding the original and inverting the original are controlled in conformity with the operation of the whole copier. In order to capture the image of the original fed onto original table 2 by reversing automatic document feeder 3, original scanner 4 is provided so as to reciprocally move in parallel along the underside of original table 2.

This original scanner 4 composes a first scanning unit 5, second scanning unit 6, optical lens 7 and photoelectric converting element 30a. The first scanning unit 5 is composed of an exposure lamp for illuminating the original image surface and the first mirror which deflects the reflected light from the original in the predetermined direction. This scanning unit 5 is located under the original table and moves back and forth at the predetermined scanning speed in parallel with and spaced from, the undersurface of the original table. The second scanning unit 6 is composed of the second and third mirrors which move back and forth in a parallel manner keeping a certain speed relationship relative to the first scanning unit 5. The light reflected on the original and deflected by the first mirror of the first scanning unit 5 is further deflected by this second scanning unit in the predetermined direction. Optical lens 7 focuses the light reflected off the original and deflected by the third mirror of the second scanning unit, on the predetermined position forming a reduced image in size. Color CCD 30a as the photoelectric converting element photo-electrically converts the image of light reduced and focused by optical lens 7 to produce an electric signal representing the reflected image of light from the original. The original image information thus converted into an electric signal by this color CCD 30a is then transferred to an image processor 31, to be described hereinbelow, where the signal is appropriately processed as image data.

Next, image forming portion 10 located in the lower side of copier body 1 will be described. Provided at the bottom of image forming portion 10 shown in FIG. 1 is a paper feeder mechanism 11, which separates sheets one by one from a stack of sheets accommodated in the sheet tray and feeds the sheet toward the recording station. The sheet thus separated and fed one by one is timing controlled and fed by a pair of resist rollers 12 located before image forming portion 10. For duplex printing, the sheet is re-fed and conveyed in synchronization with the operation of image forming portion 10.

Provided in the lower part of image forming portion 10 is a transfer conveyor belt mechanism 13 extending in a substantially parallel manner with the image forming portion. This transfer conveyor belt mechanism 13 is composed of a transfer conveyer belt 16 wound between a plurality of rollers such as a driving roller 14, driven roller 15 and the like so that the belt electrostatically attracts the paper thereto to convey it.

Provided on the downstream side of transfer conveyer belt mechanism 13 is a fixing unit 17 for fixing the toner image that has been transferred to the paper, onto the paper. The paper passes through the fixing roller nip of fixing unit 17 and further passes through a sheet path switching gate 18 and then discharged by a discharge roller 19 onto paper output tray 20 attached to the exterior wall of the machine.

Switching gate 18 is provided to select one of the two sheet paths, that is, one for discharging the sheet after fixing and the other for re-feeding the sheet to image forming portion 10. For duplex printing, the path of the sheet is switched by switching gate 18 so that the sheet is guided to the re-feeding path to image forming portion 10, and then is inverted upside down through a switch-back conveyance path 21 to be re-fed to image forming portion 10.

Arranged closely over the transfer conveyer belt 16 which is stretched in a substantially parallel manner between driving roller 14, driven roller 15 and the like, are the first, second, third and fourth image forming stations Pa, Pb, Pc and Pd arranged in parallel, in this order from the upstream side with respect to the sheet conveying direction. Transfer conveyor belt 16 is frictionally driven by the direction shown by arrow Z in FIG. 1 by means of driving roller 14, carrying the sheet as copy material which is fed by sheet feeder mechanism 11 as already explained. In this way, the sheet is successively conveyed through image forming stations Pa, Pb, Pc and Pd.

Image forming stations Pa, Pb, Pc and Pd have substantially the same configuration, and include photoreceptor drums 22a, 22b, 22c and 22d, respectively, each being rotated in the direction of arrow F in FIG. 1. Provided around photoreceptor drum 22a, 22b, 22c and 22d, are a charger 23a, 23b, 23c and 23d for uniformly charging the photoreceptor drum, a developing unit 24a, 24b, 24c and 24d for developing the static latent image formed on the photoreceptor drum, a transfer charger 25a, 25b, 25c and 25d for transferring the toner image thus developed to the sheet and a cleaning device 26a, 26b, 2c and 26d for removing the leftover toner from the photoreceptor drum. These components are arranged around the photoreceptor drum 22a, 22b, 22c and 22d in the above-mentioned order with respect to the rotational direction of the photoreceptor drum.

Provided above photoreceptor drums 22a, 22b, 22c and 22d are laser beam scanner units 27a, 27b, 27c and 27d, respectively. Each laser beam scanner unit includes a semiconductor laser element emitting a spot beam of light being moderated with image data, a deflecting device for deflecting the laser beam from the semiconductor laser element in the main scan direction, and an f-θ lens for focusing the laser beam deflected by the deflector onto the photoreceptor surface. The deflector incorporates a rotational polygonal mirror and a mirror-driving motor for driving the rotational polygonal mirror at high speed of rotation.

Input to laser beam scanner 27a is the pixel signal corresponding to the yellow component image of a color original image; input to laser beam scanner 27b is the pixel signal corresponding to the magenta component image of a color original image; input to laser beam scanner 27c is the pixel signal corresponding to the cyan component image of a color original image; and input to laser beam scanner 27d is the pixel signal corresponding to the black component image of a color original image.

In this arrangement, a static latent image corresponding to the color-converted original image information is formed on the corresponding photoreceptor drum 22a, 22b, 22c and 22d in each recording unit. Each recording station holds a different color toner, that is, yellow toner in developing unit 24a, magenta toner in developing unit 24b, cyan toner in developing unit 24c and black toner in developing unit 24d, respectively. Accordingly, in each recording station, the color-converted original image information is reproduced as a toner image having each individual color.

A paper attraction (brush-like) charger 28 is provided between the first image forming station Pa and sheet feeder mechanism 11. This paper attraction charger 28 charges the surface of transfer conveyer belt 16 so that the belt will be able to convey the paper as the copy paper, fed from paper feeder mechanism 11 from the first image forming station Pa to the fourth image forming station Pd whilst tightly attracting it thereon without causing any slippage or displacement.

A charge erasing device (not shown) is provided approximately above driving roller 14 between the fourth image station Pd and fixing unit 17. This charge erasing device is applied with an alternating current so as to separate the sheet which is electrostatically attracted to conveyer belt 16.

In the thus configured digital color copier, cut-sheet paper is used as the copy material. This copy sheet is delivered out from the paper cassette and fed into the guide to the sheet conveying path of paper feeder mechanism 11, then the leading part of the copy sheet is detected by the aforementioned sensor (not shown). Then the copy sheet is halted at resist roller pair 12 based on the detection signal output from the above sensor. Thereafter, the sheet is conveyed toward conveyor belt 16 running in the direction of arrow Z in FIG. 1, at a time synchronized with the operations of image forming stations Pa, Pb, Pc and Pd. During conveyance, the sheet will be conveyed stably passing through image forming stations Pa, Pb and Pc and Pd since conveyer belt 16 has been charged appropriately by paper attraction charger 28 mentioned above.

In each image forming station Pa, Pb, Pc and Pd, a toner image of a different color is formed by the aforementioned arrangement, and each toner image is superimposed over the support surface of the copy sheet being electrostatically attracted to and conveyed by conveyer belt 16. When the transfer of the image in the fourth image forming station Pd has been completed, the copy sheet, specifically the leading edge of the paper, is separated from conveyer belt 16 with the help of the charge erasing charger, and is conveyed to fixing unit 17. Finally, the copy sheet with a toner image fixed thereon is discharged through the copy sheet output port to paper output tray 20.

(Illustration of the circuit of the image processing unit)

Next, the configuration and function of the image processing unit of the color image information, installed in the digital color copier, will be described.

Figure 2A:
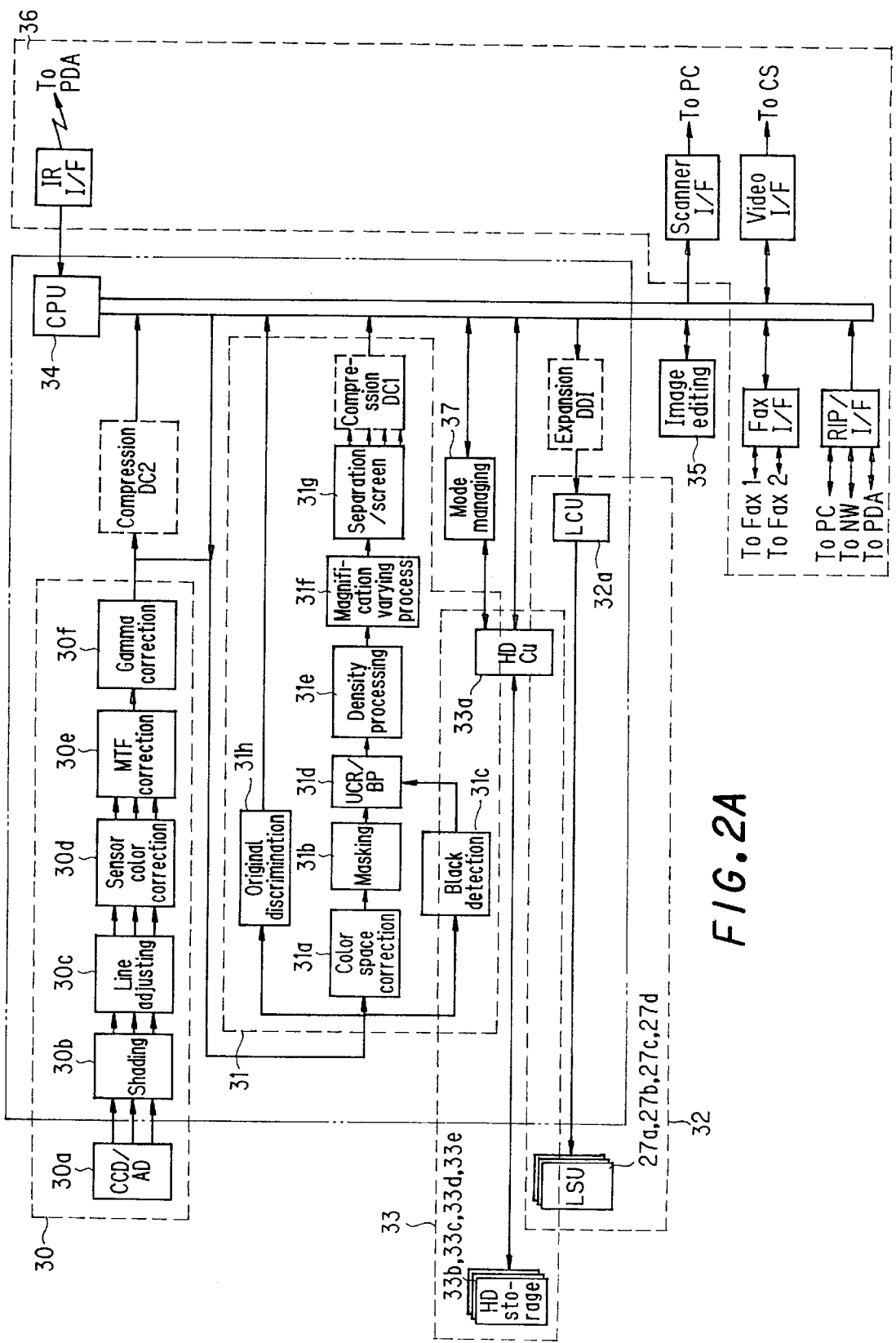
FIGS. 2A and 2B are block diagrams of image processing circuits of the digital color copier shown in FIG. 1.
Figure 2B:
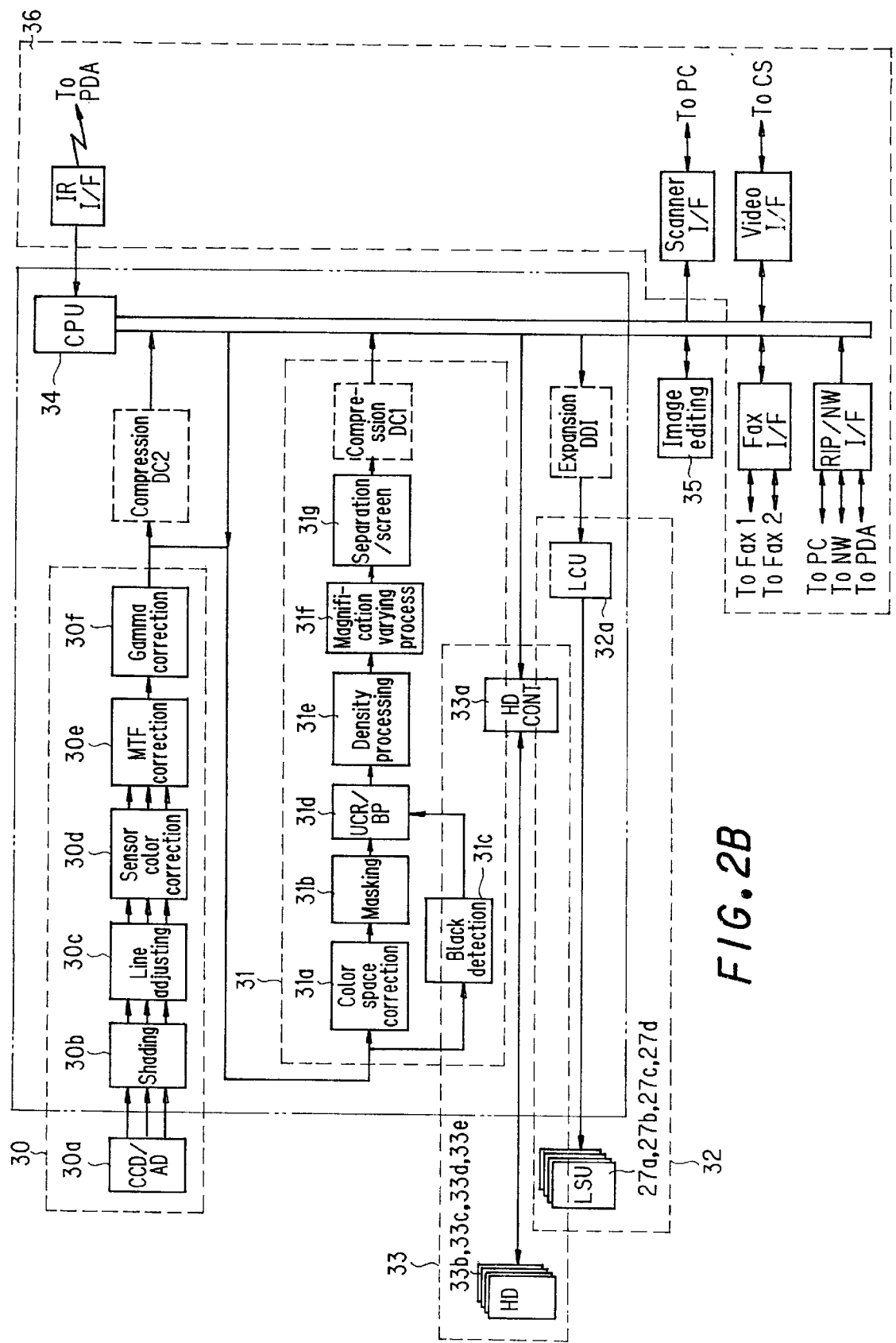

FIGS. 2A and 2B are block diagrams showing image processing circuits of the digital color copier. The image processing circuit contained in this digital copier comprises an image data input portion 30, image processing portion 31, image data output portion 32, image memory 33 composed of hard disk drivers etc., a central processing unit (CPU) 34, an image editing portion 35 and an external interface portion 36. The configuration shown in FIG. 2A further includes a mode manager 37.

Image data input portion 30 includes: a three-line color CCD 30a capable of capturing a color original image and outputting RGB color separated line data, also shown in FIG. 1; a shading correcting circuit 30b for correcting the line image level of the line data captured by color CCD 30a; a line adjusting portion 30c with line buffers to correct the displacement of line data; a sensor color correcting portion 30d for correcting color data of the line data for each color; an MTF correcting portion 30e for correcting or enhancing the signal for every pixel; and a gamma-correcting portion 30f for performing a visual sensitivity correction by adjusting the brightness of the image.

Image processing portion 31 comprises: a color space correcting circuit 31a; a masking circuit 31b; a black component detecting circuit 31c, an under color removal/black adding circuit (UCR/BP) 31d; a density processing circuit 31e; a magnification varying circuit 31f; and a separation/screen circuit 31g. The configuration shown in FIG. 2A further includes an original discriminating portion 31h.

Here, color space correcting circuit 31a adjusts the reproducible color range of the color image signal being input through image data input portion 30 or an aftermentioned external interface portion 36, to the reproducible color range of the color toner in the recording apparatus. Masking circuit 31b converts the RGB signals of the input image data into the YMC signals corresponding to the recording units of the recording apparatus. Black component detecting circuit 31c detects the black component from the RGB signals of the color image being input through image data input portion 30 or aftermentioned interface portion 36. Under color removal/black adding circuit 31d, based on the YMC signals being output from masking circuit 31b, performs black addition of the black component signal being output from black component detecting circuit 31c. Density processing circuit 31e adjusts the density of the color image signal based on a density converting table. Magnification varying circuit 31f varies the magnification of the input image information based on the selected magnification. Separation/screen circuit 31g detects characters, photography, halftone areas in the image information, from the input image data to separate the areas one from another and determine the output pattern of the image. Further, original discriminating portion 31h in the configuration shown in FIG. 2A discriminates between the color types of the original (color or monochrome).

Image data output portion 32 comprises: a laser control unit 32a for performing pulse-width modulation based on the image data of each color; and laser scanner units (LSU) 27a, 27b, 27c and 27d for the different colors to perform laser recording based on the pulse width modulated signals in accordance with image signals for the different colors output from laser control unit (LCU) 32a. Laser control unit (LCU) 32a also serves as a mirror-driving motor governor means for controlling the mirror-driving motors which drive the rotational polygonal mirrors for laser deflection.

Image memory 33 is composed of: a hard disk control unit (HDCU) 33a, which successively receives four color sets of 32 bit image data (8 bits for each color) output from image processing portion 31, temporarily stores the data in the buffer and converts the 32 bit data into four sets of 8 bit image data (for four colors) in order to separately control them into the four hard discs; and four hard disks (HD) 33b, 33c, 33d and 33e for separately storing and controlling the 8 bit image data of respective colors.

Central processing unit (CPU) 34 controls image data input portion 30, image processing portion 31, image data output portion 32, image memory 33, image editing portion 35 and external interface portion 36 (the latter two will be detailed hereinbelow), based on the predetermined sequence.

Image editing portion 35 performs predetermined image editing of the image data which is stored temporarily in image memory 33 after being processed through image data input portion 30, image processing portion 31 or interface portion 36 to be described hereinbelow. Interface portion 36 is a communication interface means for receiving the image data from an external image input processing unit separately provided outside the digital copier. Examples of external input include a facsimile machine, image reader, external scanner, video and image data from a network, as shown in FIGS. 2A and 2B.

Image data input from interface portion 36 is also temporarily input into image processing portion 31 where color space correction etc. is performed, so that the data is level converted so as to be handled by the image memory 33 of the digital copier. Then, the thus processed data is stored in and controlled by hard discs 33b, 33c, 33d and 33e.

Mode manager 37 in FIG. 2A controls the usage-frequencies of the first processing mode in which the input image information is image formed as color image information and the second processing mode in which the input image information is image formed as monochrome image information. In practice, the manager stores the usage-frequencies of the processing modes implemented in the past into the storage means such as a hard disk etc.

(Explanation of the control system of the whole digital copier)

FIG. 3 is a block diagram of the whole digital copier showing the state where CPU 34 controls the operations of different units. Explanation concerning image data input portion 30, image processing portion 31, image data output portion 32, image memory 33 and CPU 34 is contained in FIGS. 2A and 2B and is omitted.

CPU 34 performs sequence control of each driver mechanism constituting the digital copier, such as ADF 40, a sorter unit 41, a scanner unit 42, laser printer unit 43, disk related loads 44 and output control signals to these units. Further, CPU 34 is connected to control board unit 38 made up of a control panel in an inter-communicable manner so that control signals in accordance with the copy mode designated by the operator are transferred to CPU 34 to thereby operate the digital copier in accordance with the setup mode.

CPU 34 issues a control signal representing the operating state of the digital copier to control board unit 38 as the control panel. The control board unit 38 side, based on this control signal, displays the operating state through a display etc., so as to inform the operator of in what state the copier is.

External interface 36 as the image data communication unit, as has been described in FIGS. 2A and 2B, is provided to enable communications of information such as image information, image control signals, etc., with other digital imaging appliances.

CPU 34 also has the function of determining the laser recording status. The laser recording status determination is to determine the laser recording states of LSUs 27a to 27d, and will be detailed later.

(Explanation of the control panel)

Figure 4:
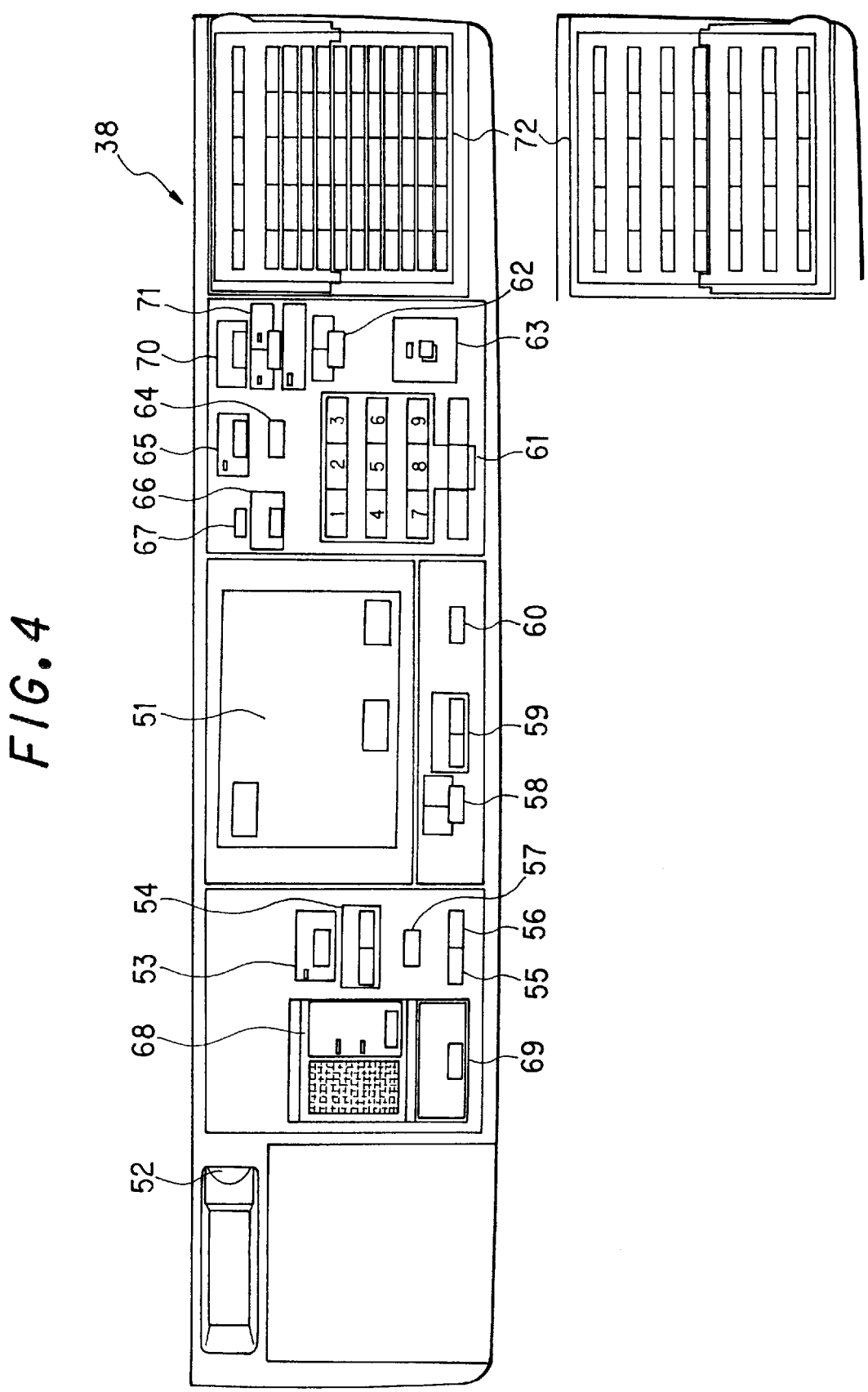
FIG. 4 is a view showing the control panel of the digital color copier shown in FIG. 1.

Referring next to FIG. 4, the control panel of digital color copier 1 will be described.

Arranged in the center of control panel 38 is a touch panel type liquid crystal display device 51 having a group of mode setup keys arranged on the periphery thereof. Displayed continuously on the screen of touch-type liquid crystal display device 51 is a frame switching command area for switching the frame to allow for selection of image editing functions. When this area is directly operated with a finger, a list menu of various editing functions appears on the liquid crystal screen. When the operator touches with a finger an area representing the operator's desired function from the variety of image editing functions displayed, a desired editing function can be selected.

Now, setup keys arranged on the control panel will be briefly described. Designated at 52 is a dial for adjusting the brightness of the screen of liquid crystal display device 51. Designated at 53 is an automatic magnification setting key for setting up the mode in which the magnification is selected automatically; 54 a zoom key for setting the copy magnification with increments of 1%; 55 and 56 fixed magnification keys for selecting a fixed magnification from the predetermined magnifications; and 57 an isometric magnification key for reverting the copy magnification to the standard magnification (isometric magnification).

Designated at 58 is a density switching key allowing for switching of copy density adjustment modes, from the automatic mode to the manual or photographic mode; 59 a density adjusting key allowing for fine control of the density level in the manual or photographic mode; and 60 a tray selecting key allowing for selection of a desired paper size from the sheet sizes of the paper set in the paper feeder of digital color copier 1.

Designated at 61 is a copy number setting key allowing for setup of the copy number; 62 a clear key for clearing the copy number and stopping a continuous copying operation partway; 63 a start key for instructing the copy start; 64 a reset key for canceling all the currently set modes and reverting to the default state; 65 a cut-in key for permitting a copying operation of other originals during the current continuous copying operation; 66 a control guide key for allowing for message display of control methods of the copier when the user does not know how to control digital color copier 1; and 67 a message progression key for displaying the next message to the one displayed by the operation of control guide key 66. Designated at 68 is a duplex mode setting key allowing for setup of a duplex copy mode; and 69 a post-processing mode selecting key for setting the operating mode of the post-processing apparatus for sorting copies discharged from digital color copier 1.

Designated at 70 to 72 are setting keys concerning printer and facsimile modes, specifically, 70 is a memory transmission mode key allowing for transmission of the data of an original which have been once stored in the memory; 71 is a copy, fax and print mode selecting key for selecting one operating mode of digital color copier 1, from copy, fax and print modes; and 72 designates quick dialing keys allowing the user to make an instant selection of a fax addressee upon transmission, from previously stored addressee's phone numbers.

The control panel and the keys arranged on the control panel presented here are just an example, and the arrangement of keys on the control panel will needless to say be different depending upon the functions installed in digital color copier 1.

Next, the first to ninth embodiments of this color digital copier will be described with reference to FIGS. 5 through 13.

(The 1st embodiment)

Figure 5:
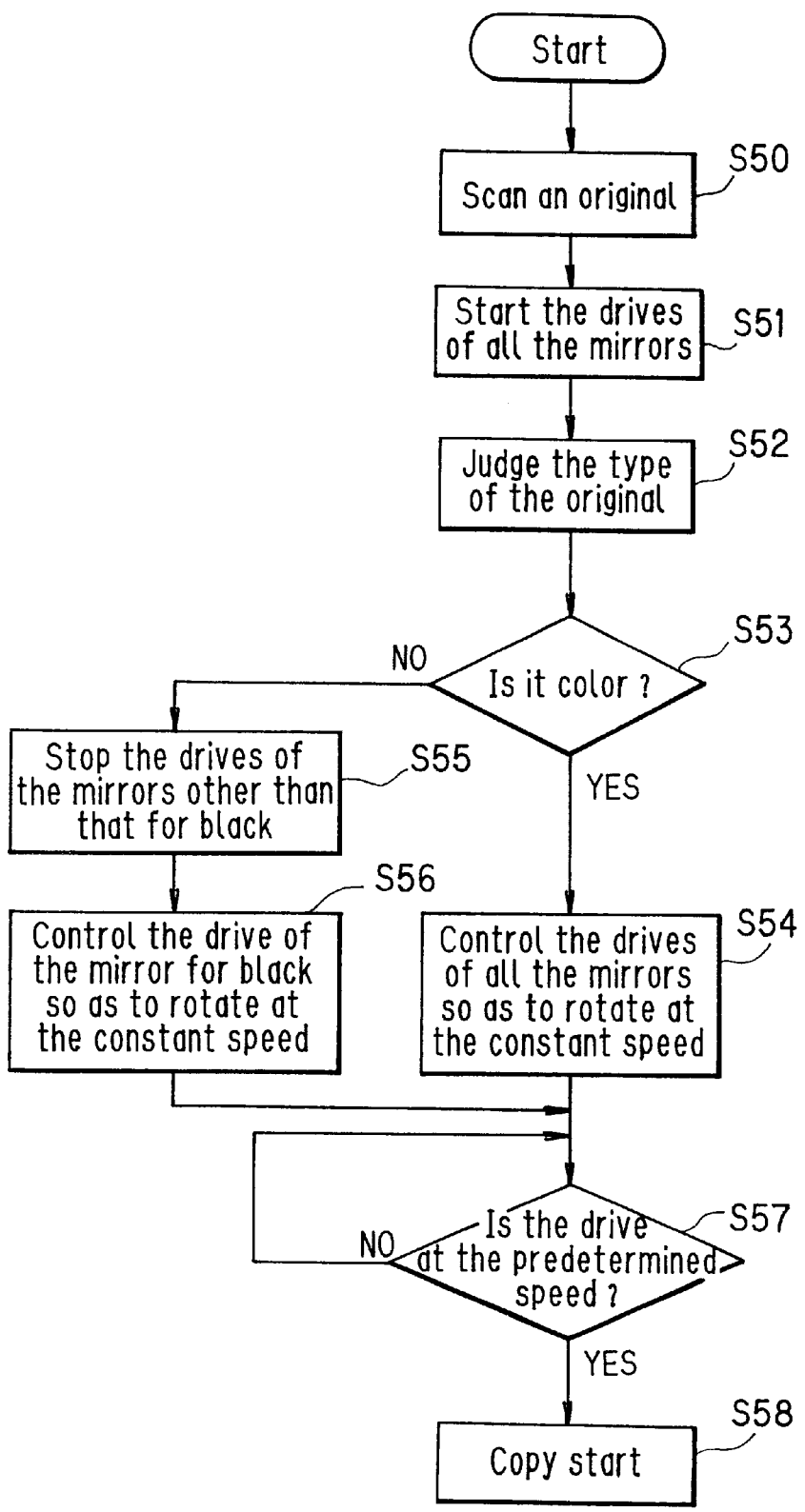
FIG. 5 is a flowchart showing the operation of the first embodiment.

The first embodiment is the configuration shown in the block diagram of FIG. 2A with no mode manager 37 provided therein (or in which mode manager 37 is not used). FIG. 5 is a flowchart showing the operation of the first embodiment of the digital color copier.

An original set on automatic document feeder 3 is fed and placed on original table 2 when the operator presses start key 63 on control panel 38, and then is scanned by the first and second scanning units 5 and 6 (Step S50). At the same time, when start key 63 is pressed, CPU 34 activates each unit and the mirrors of laser beam scanners 27a, 27b, 27c and 27d begin to rotate (Step S51). The image data captured by this scanning is provided to original discriminating portion 31h in image processor 31 in FIG. 2A where the color type of the original (color original or monochrome original) is determined (Step S52). Then from the discrimination result, it is checked whether the original is of color or not (Step S53) and the determined result is input to CPU 34.

LCU 32a, the mirror-driving motor governor means, controls all the mirrors (rotational polygonal mirrors) so that they will all be driven at the constant speed of rotation (Step S54) if the original is judged to be of color. If the original is monochrome, rotation of the mirrors other than that for black is retarded or stopped (Step S55) while the mirror for black is controlled so as to be driven at the constant speed of rotation (Step S56). That is, when the original is monochrome, only the mirror of laser beam scanner 27d for forming black images is kept rotating while the drives of the other mirrors are retarded or stopped. In either case, when the drive of the mirror or mirrors has reached the predetermined speed of rotation (Step S57), the copying operation is started (Step S58).

In this way, LCU 32a controls the drives of the mirror-driving motors of laser beam scanners 27a to 27d in accordance with the color type of the scanned original (either color or monochrome). Accordingly, the features of the image, or original, etc., are automatically extracted from the input image data so that only the mirror or mirrors required for forming the image are started to rotate, thus making it possible to make the copier active within a short time. Therefore, the acquisition time of the first copy can be shortened and also it is possible to avoid unnecessary driving of the motors in the recording portions which will not be engaged in recording the input image. Consequently, reduction of the life of the motors and/or problems of noise and wasted power consumption can be prevented.

(The 2nd embodiment)

Figure 6:
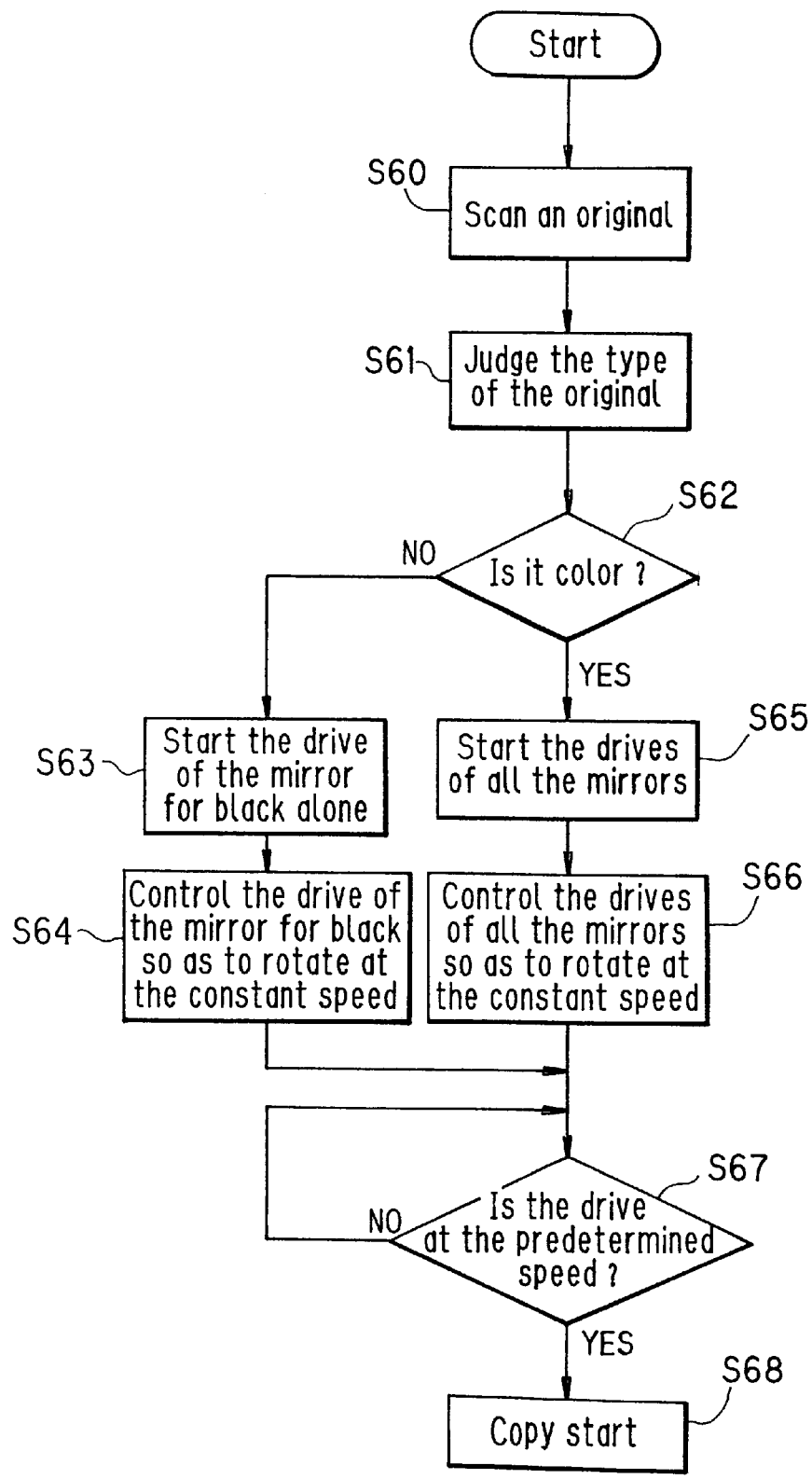
FIG. 6 is a flowchart showing the operation of the second embodiment.

Next description will be made of the second embodiment. This embodiment has the same configuration as the first embodiment except in that the mirrors of the laser beam scanners are controlled in a different way. FIG. 6 is a flowchart showing the operation of the second embodiment of the digital color copier.

The operation is effected as shown in FIG. 6. That is, when start key 63 on the control panel is pressed, the original is scanned by the first and second scanning units 5 and 6 (Step 60). The image data captured by this scanning is provided to original discriminating portion 31h in image processor 31 in FIG. 2A where the color type of the original (color original or monochrome original) is determined (Step S61). Then from the discrimination result, it is checked whether the original is of color or not (Step S62).

When the original is monochrome, LCU 32a transmits a rotation activation signal which instructs only the mirror of laser beam scanner 27d for forming black images to rotate (Step S63) so that this mirror is controlled so as to rotate at the constant speed of rotation (Step S64). On the other hand, when the original is of color, all the mirrors are started and driven (Step S65) and are controlled so as to be driven at the constant speed of rotation (Step S66).

After the drive of the mirror or mirrors has reached the predetermined speed of rotation (Step S67), the copying operation is started (Step S68).

In this way, if the original is of a monochrome type, only the mirror-driving motor for black recording is activated while the mirror-driving motors for color recording remain static. Thus, it is possible to avoid unnecessary driving of the motors which will not be engaged in image recording and hence reduction of the life of the motors, and/or problems of noise and wasted power consumption can be prevented.

(The 3rd embodiment)

Figure 7:
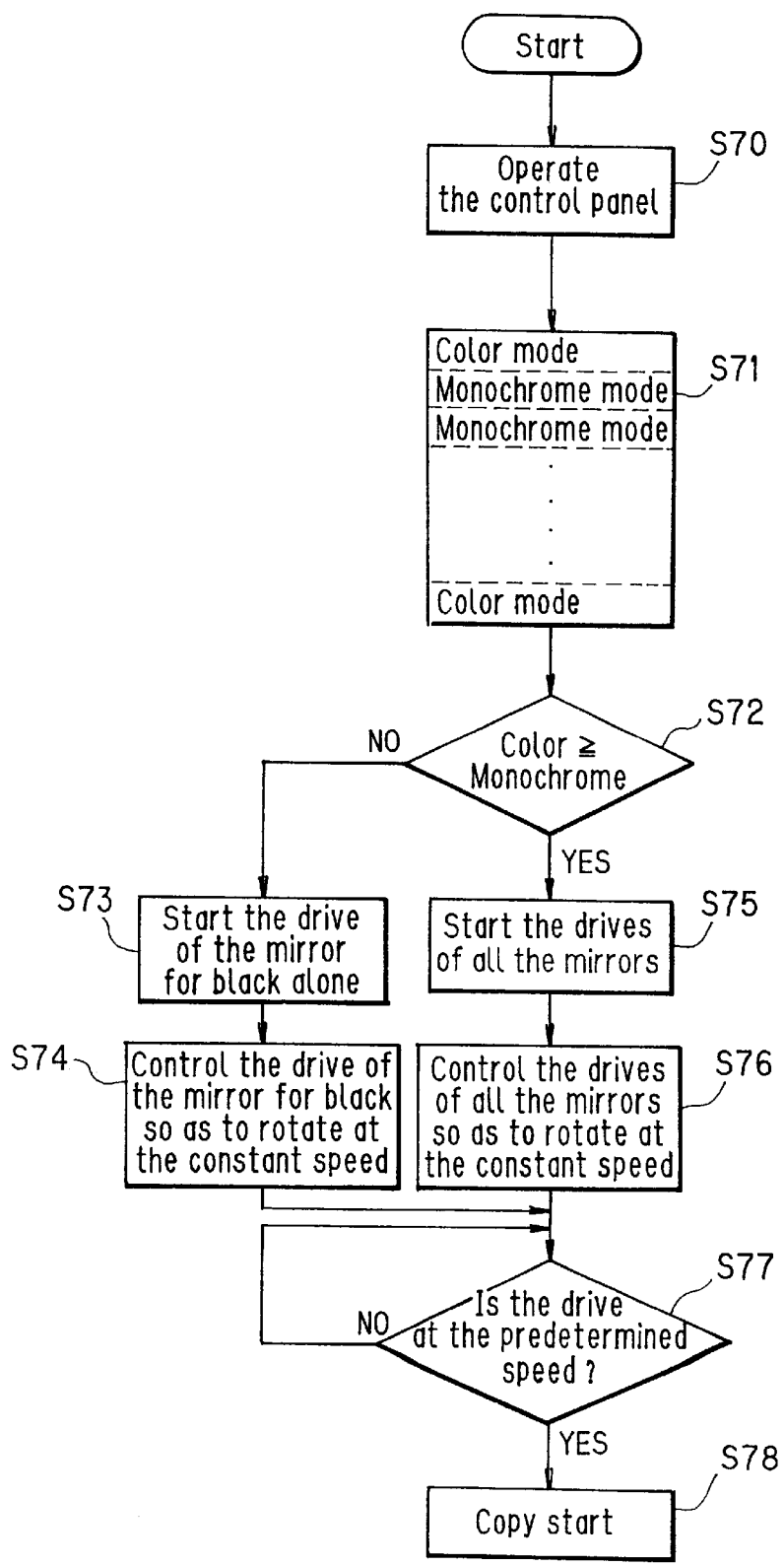
FIG. 7 is a flowchart showing the operation of the third embodiment.

Next description will be made of the third embodiment. This embodiment has the configuration shown in the block diagram of FIG. 2A in which mode manager 37 is employed with no original discriminating portion 31h (or original discriminating portion 31h is not used). FIG. 7 is a flowchart showing the operation of the third embodiment of the digital color copier.

When control panel 38 is operated (Step S70), mode manager 37 refers to the usage-frequency data representing the past mode frequencies, i.e., in what modes the machine has been operated (Step S71), and based on the count data, the mode manager selects the most frequently used mode. For example, as regards the color imaging mode and the monochrome imaging mode, these mode frequencies are compared (Step S72). Suppose that the monochrome imaging mode count is greater in the usage-frequency data, CPU 34 issues a rotation activation signal to LCU 32a so as to rotate only the mirror of laser beam scanner 27d for forming black images (Step S73) to thereby control it so as to rotate at the constant speed of rotation (Step S74).

On the other hand, when the color imaging mode count is greater in the usage-frequency data, CPU 34 issues a rotation activation signal to LCU 32a so as to rotate not only the mirror of laser beam scanner 27d but also all the mirrors of laser beam scanners 27a, 27b and 27c for forming yellow, magenta and cyan component images (Step S75) to thereby control all of them so as to rotate at the constant speed of rotation (Step S76). When the drive of the mirror or mirrors has reached the predetermined speed of rotation (Step S77), the copying operation is started (Step S78).

In this way, mode manager 37 is adapted to take and select the most frequently used processing mode of the digital color copier, and when the copier is operated, the drives of the mirror-driving motors are started so as to perform recording in the most frequently used processing mode. Accordingly, when a copying operation is made in the most frequently used recording mode, this configuration is advantageous in reducing the waiting time before recording.

(The 4th embodiment)

Figure 8:
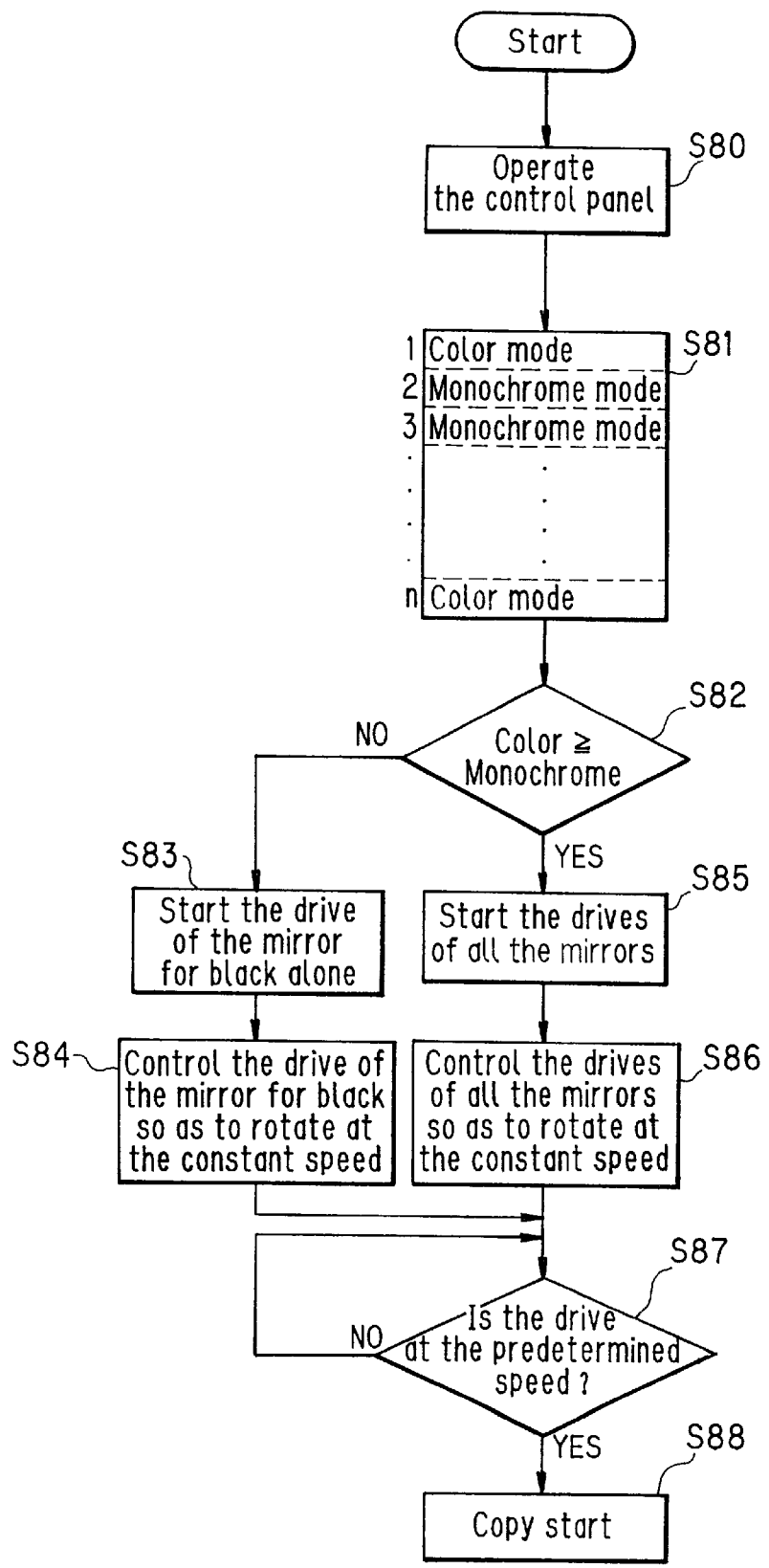
FIG. 8 is a flowchart showing the operation of the fourth embodiment.

Referring next to FIG. 8, the fourth embodiment will be described. In this embodiment, mode manager 37 in FIG. 2A not only checks the usage-frequencies of the processing modes used in the past, but also the usage-frequencies in a predetermined number of recent operations. FIG. 8 is the flowchart showing the operation of the fourth embodiment of the color digital copier.

When control panel 38 is operated (Step S80), mode manager 37 refers to the usage-frequency data representing the past mode frequencies of the last n times of operation (Step S81), and the manager selects the most frequently used mode from the last n times of operation, based on the mode counts. For example, as regards the color imaging mode and the monochrome imaging mode, these mode frequencies are compared (Step S82). Suppose that the monochrome imaging mode count is greater in the usage-frequency data of the last n times of operation, CPU 34 issues a rotation activation signal to LCU 32a so as to rotate only the mirror of laser beam scanner 27d for forming black images (Step S83) to thereby control it so as to rotate at the constant speed of rotation (Step S84).

On the other hand, when the color imaging mode count is greater in the usage-frequency data of the last n times of operation, CPU 34 issues a rotation activation signal to LCU 32a so as to rotate not only the mirror of laser beam scanner 27d but also all the mirrors of laser beam scanners 27a, 27b and 27c for forming yellow, magenta and cyan component images (Step S85) to thereby control all of them so as to rotate at the constant speed of rotation (Step S86). Then, when the drive of the mirror or mirrors has reached the predetermined speed of rotation (Step S87), the copying operation is started (Step S88).

The mode manager means is designed to store the n records of operation history, so that when the information of the most recent operation is stored, the oldest operation record (of the n records) is automatically deleted.

In this way, control of the mirror-driving motors is performed in the most frequently used mode, based on the usage-frequencies in the last predetermined number of operations, and hence the probability of the predicted processing mode coinciding with the actually effected mode can be increased. Therefore, this configuration is effective in reducing the waiting time before recording when a copying operation is made in a mode coinciding with the most frequently used recording mode.

(The 5th embodiment)

Figure 9:
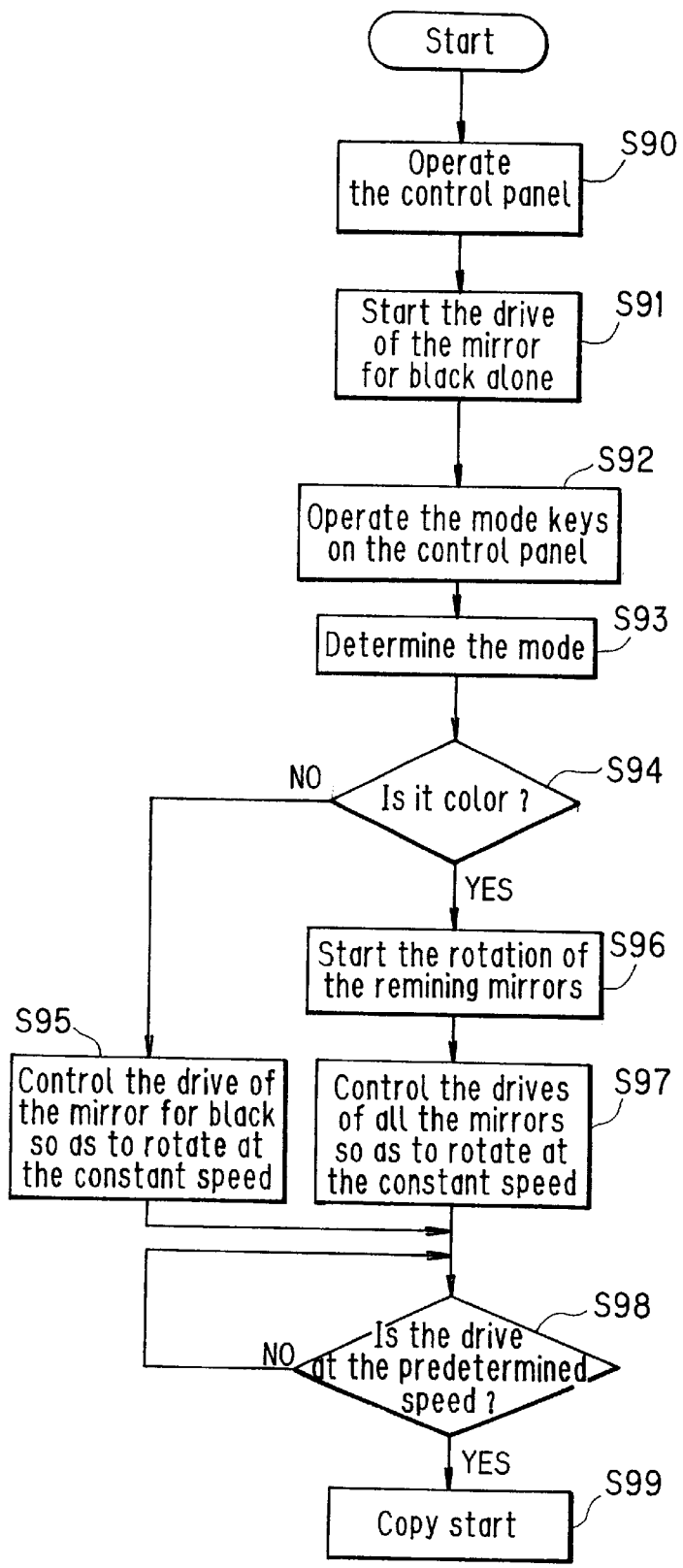
FIG. 9 is a flowchart showing the operation of the fifth embodiment.

Referring next to FIG. 9, the fifth embodiment will be described. In this embodiment, instead of determining the processing mode using original discriminating portion 31$h$ or mode manager 37 as has been explained in the above embodiments, the processing mode is selected through control panel 38. FIG. 9 is the flowchart showing the operation of the fifth embodiment of the color digital copier.

When control panel 38 is operated (Step S90), regardless of the past mode history information CPU 34 first issues a rotation activation signal to LCU 32$a$ so as to rotate only the mirror of laser beam scanner 27$d$ for forming black images and hence this mirror alone starts to rotate (Step S91). Then, a processing mode is designated through control panel 38 (Step S92) and the input mode is discriminated (Step S93). The discrimination result is checked, that is, it is checked whether the original is of color or not (Step S94).

If the operation is not in the color mode but in the monochrome mode, the mirror of laser beam scanner 27$d$ for forming black images is controlled so as to be driven at the constant speed of rotation (Step S95). On the other hand, if the operation is in the color mode, CPU 34 issues a rotation activation signal to LCU 32$a$ so as to rotate all the remaining mirrors of the laser beam scanners 27$a$, 27$b$ and 27$c$ for forming yellow, magenta and cyan component images (Step S96) to thereby control all of them so as to rotate at the constant speed of rotation (Step S97). When the drive of the mirror or mirrors has reached the predetermined speed of rotation (Step S98), the copying operation is started (Step S99).

In this way, when a processing mode has been selected through the control panel, the mirror-driving motor for the monochrome mode, which is most likely to be used, is first activated and driven. Therefore, this configuration is effective in reducing the waiting time before recording as well as in reducing noise.

(The 6th embodiment)

Figure 10:
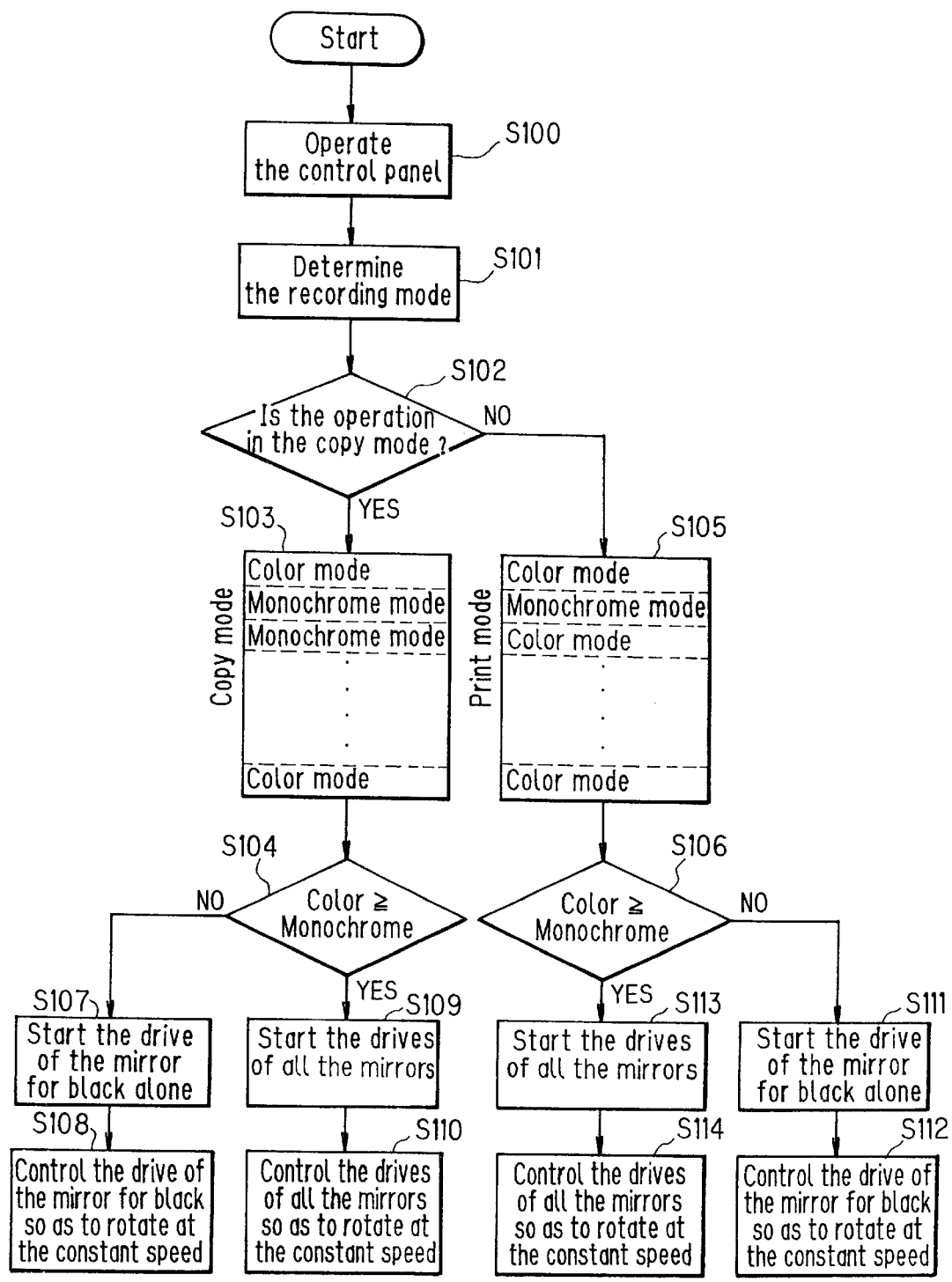
FIG. 10 is a flowchart showing the operation of the sixth embodiment.

Referring next to FIG. 10, the sixth embodiment will be explained. In this embodiment, mode manager 37 controls both the processing mode for the image information input from image data input portion 30 and the processing mode for the image information input from external interface 36. The mirror-driving motors will be controlled based on the usage-frequencies concerned with each mode. FIG. 10 is the flowchart showing the operation of the sixth embodiment of the digital color copier.

In this embodiment, there are two types of recording modes: one is the copy mode in which images are formed from the input of image information from image data input portion 30; and the other is the print mode in which images are formed from the input of image information through external interface 36. Mode manager 37 is designed to be able to record the past usage-frequencies of the processing modes for each of the two types.

When one of the processing modes has been selected through control panel 38 (Step S100), it is judged in which recording mode the operation is to be done (Step S101) and then it is checked whether the operation is in the copy mode (Step S102). When the operation is in the copy mode, mode manager 37 refers to the past usage-frequency counts for the processing modes in this copy mode (Step S103). For example, as regards the color imaging mode and the monochrome imaging mode, these mode frequencies are compared (Step S104). Suppose that the usage-frequency of the monochrome imaging mode is greater, CPU 34 issues a rotation activation signal to LCU 32$a$ so as to rotate the mirror of laser beam scanner 27$d$ for forming black images (Step S107) to thereby control it so as to rotate at the constant speed of rotation (Step S108). On the other hand, when the usage-frequency of the color imaging mode is greater, CPU 34 issues a rotation activation signal to LCU 32$a$ so as to rotate all the remaining mirrors of laser beam scanners 27$a$, 27$b$ and 27$c$ for forming yellow, magenta and cyan component images (Step S109) to thereby control all of them so as to rotate at the constant speed of rotation (Step S110). When the drive of the mirror or mirrors has reached the predetermined speed of rotation, the copying operation is started in the same manner as already stated in the above embodiments.

When the operation is in the print mode, the mode manager refers to the past usage-frequency counts for the processing modes in this print mode (Step S105). The usage-frequencies of the monochrome imaging mode and the color imaging mode are compared (Step S106). When the usage-frequency of the monochrome imaging mode is greater, CPU 34 issues a rotation activation signal to LCU 32$a$ so as to rotate the mirror of laser beam scanner 27$d$ for forming black images (Step S111) to thereby control it so as to rotate at the constant speed of rotation (Step S112). On the other hand, when the usage-frequency of the color imaging mode is greater, CPU 34 issues a rotation activation signal to LCU 32$a$ so as to rotate all the remaining mirrors of laser beam scanners 27$a$, 27$b$ and 27$c$ for forming yellow, magenta and cyan component images (Step S113) to thereby control all of them so as to rotate at the constant speed of rotation (Step S114). When the drive of the mirror or mirrors has reached the predetermined speed of rotation, the printing operation is started in the same manner as already stated in the above embodiments.

In this way, mode manager 37 checks both the most frequently used processing mode in the copy mode and the most frequently used processing mode in the print mode so as to control the drives of the mirror-driving motors in accordance with the selected mode. Accordingly, this configuration is effective in reducing the waiting time when copying or printing operation is effected in the most frequently used processing mode for each of the two recording modes.

(The 7th embodiment)

Figure 11:
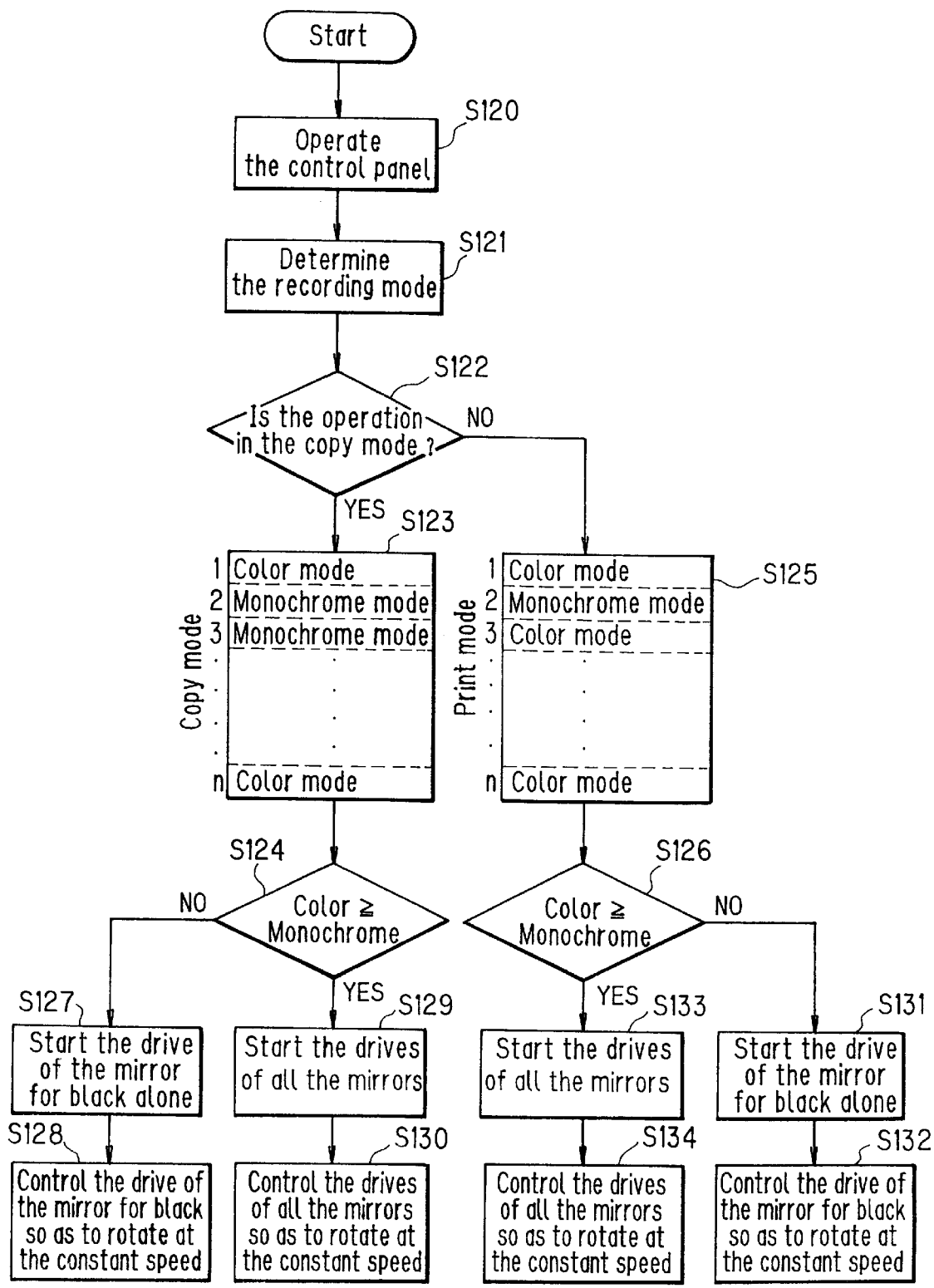
FIG. 11 is a flowchart showing the operation of the seventh embodiment.

Referring next to FIG. 11, the seventh embodiment will be explained. In this embodiment, as in the sixth embodiment, mode manager 37 checks both the copy mode which is based on the image information input from image data input portion 30 and the print mode which is based on the image information input through external interface 36. Further, the mirror-driving motors are controlled based on the usage-frequencies of the processing modes implemented in the past last predetermined number of operations (n times of operations). FIG. 11 is the flowchart showing the operation of the seventh embodiment of the digital color copier.

When one of the modes has been selected through control panel 38 (Step S120), the recording mode is checked (Step S121) so that it can be determined whether the operation is in the copy mode (Step S122).

When the operation is in the copy mode, the mode manager refers to the past usage-frequency counts with regard to the processing mode within this copy mode for the last n times of operation (Step S123). It is checked whether the color imaging or monochrome imaging mode has been more frequently used (Step S124). When the usage-frequency of the monochrome imaging mode is greater, CPU 34 issues a rotation activation signal to LCU 32a so as to rotate the mirror of laser beam scanner 27d for forming black images (Step S127) to thereby control it so as to rotate at the constant speed of rotation (Step S128). On the other hand, when the usage-frequency of the color imaging mode is greater, CPU 34 issues a rotation activation signal to LCU 32a so as to rotate all the remaining mirrors of laser beam scanners 27a, 27b and 27c for forming yellow, magenta and cyan component images (Step S129) to thereby control all of them so as to rotate at the constant speed of rotation (Step S130). When the drive of the mirror or mirrors has reached the predetermined speed of rotation, the copying operation is started in the same manner as already stated in the above embodiments.

When the operation is in the print mode, the mode manager refers to the past usage-frequency counts with regard to the processing mode within this print mode for the last n times of operation (Step S125). The usage-frequencies of the color imaging and monochrome imaging modes are compared (Step S126). When the usage-frequency of the monochrome imaging mode is greater, CPU 34 issues a rotation activation signal to LCU 32a so as to rotate the mirror of laser beam scanner 27d for forming black images (Step S131) to thereby control it so as to rotate at the constant speed of rotation (Step S132). On the other hand, when the usage-frequency of the color imaging mode is greater, CPU 34 issues a rotation activation signal to LCU 32a so as to rotate all the remaining mirrors of laser beam scanners 27a, 27b and 27c for forming yellow, magenta and cyan component images (Step S133) to thereby control all of them so as to rotate at the constant speed of rotation (Step S134). When the drive of the mirror or mirrors has reached the predetermined speed of rotation, the printing operation is started in the same manner as already stated in the above embodiments.

In this embodiment, the mode manager means is designed to store the n records of operation history for each of the copy and print modes. Accordingly, when the copy mode is set, the recording memory for the copy mode is updated. When the print mode is set the recording memory for the print mode is updated. In either case, when the information on the most recent operation is stored, the oldest operation record (of the n records) is automatically deleted.

In this way, mode manager 37 manages the processing history of the last n times of operation in the copy mode and processing mode history of the last n times of operation in the print mode, separately, so as to control the drives of the mirror-driving motors in accordance with the selected mode. Accordingly, this configuration is effective in reducing the waiting time before recording when a copying or printing operation is made in its most frequently used recording mode.

(The 8th embodiment)

Figure 12:
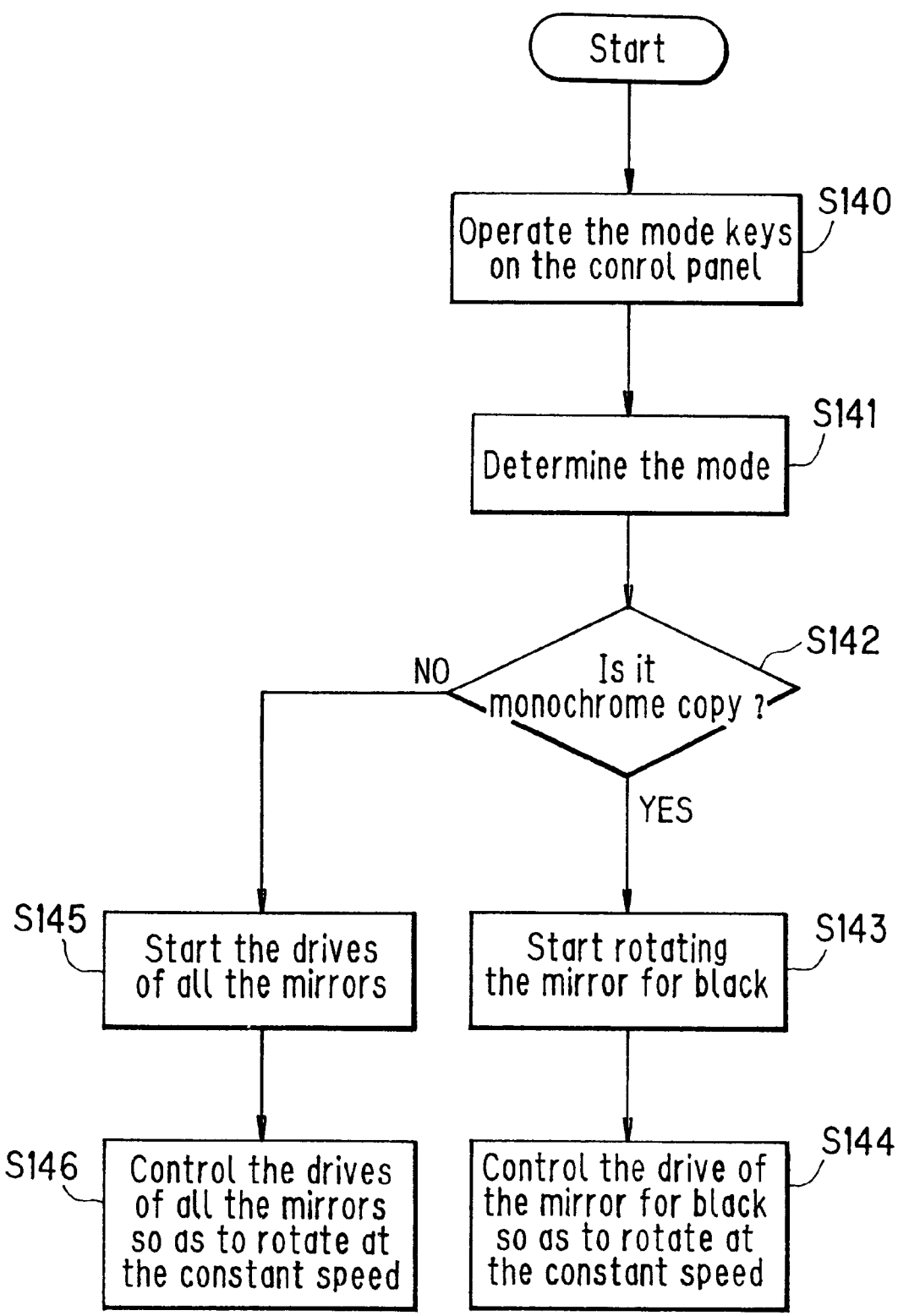
FIG. 12 is a flowchart showing the operation of the eighth embodiment.

Referring next to FIG. 12, the eighth embodiment will be described. This embodiment allows the user to select the processing mode of the input image information, either processing the input as color image information or processing it as monochrome image information, through control panel 38. FIG. 12 is the flowchart showing the operation of the eighth embodiment of the digital color copier.

The user operates control panel 38 (Step S140) so as to select either the monochrome or color copy mode. It is judged which mode, monochrome or color copy mode has been selected (Step S141). It is checked whether the operation is in the monochrome copy mode (Step S142). If the operation is in the monochrome copy mode, CPU 34 issues a rotation activation signal to LCU 32a so as to rotate only the mirror of laser beam scanner 27d for forming black images (Step S143) to thereby control this mirror alone so as to rotate it at the constant speed of rotation (Step S144). On the other hand, when the color mode has been selected, CPU 34 issues a rotation activation signal to LCU 32a so as to rotate not only the mirror of laser beam scanner 27d but also all the mirrors of laser beam scanners 27a, 27b and 27c for forming yellow, magenta and cyan component images (Step S145) to thereby control all of them so as to rotate it at the constant speed of rotation (Step S146). When the drive of the mirror or mirrors has reached the predetermined speed of rotation, the copying operation is started in the same manner as already stated in the above embodiments.

In this way, the drives of the mirror-driving motors are controlled in accordance with the processing mode designated through manual selecting keys on control panel 38. Accordingly, immediately after the selection of the processing mode, only the mirror-driving motor or motors required for the selected recording mode are controlled so as to rotate at the constant speed of rotation, hence it is not only effective in reducing the waiting time before recording but also it is possible to avoid unnecessary driving of the motors and hence the reduction of the life of the mirror-driving motors, the problem of noise and wasted power consumption can be prevented.

(The 9th embodiment)

Figure 13:
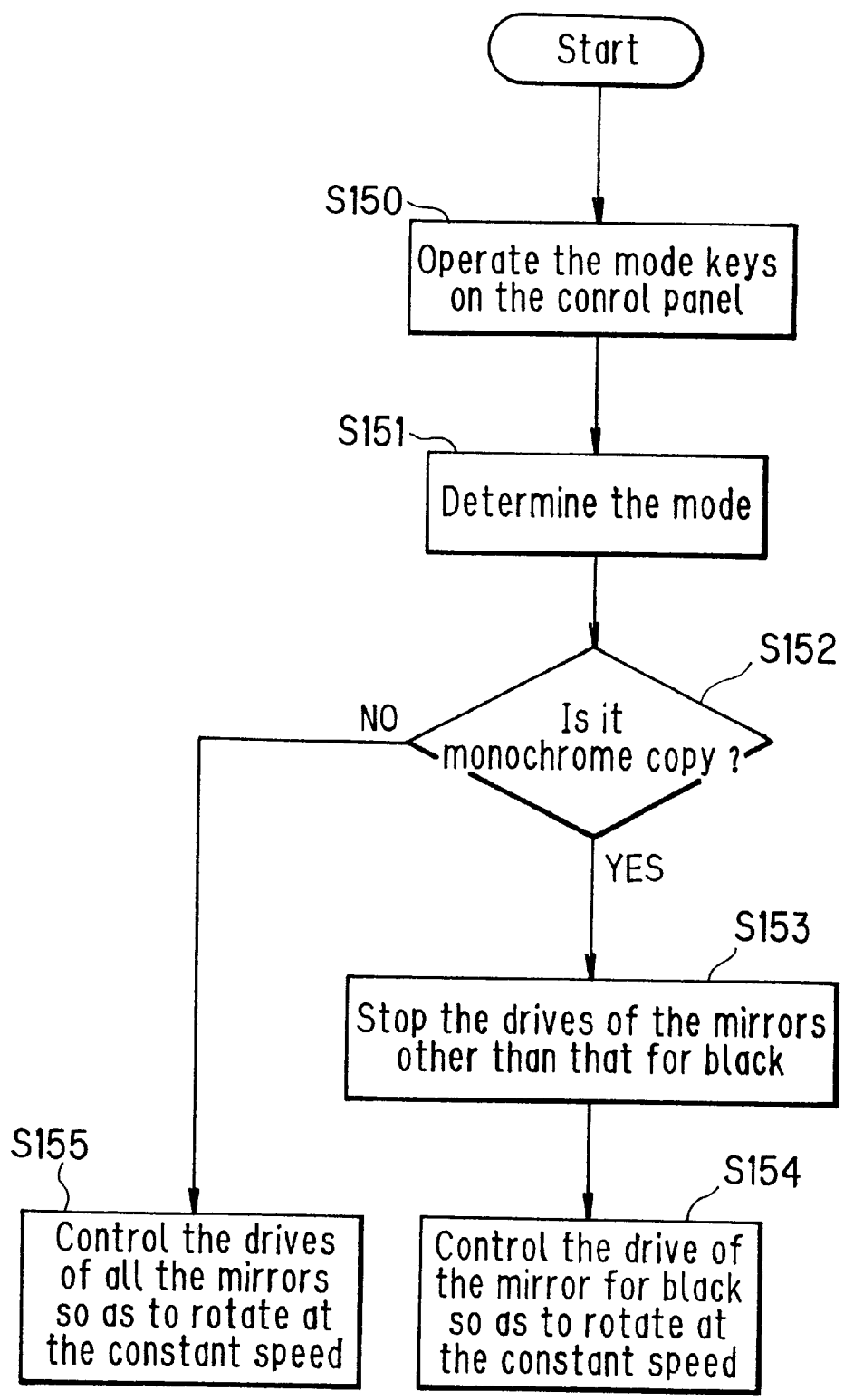
FIG. 13 is a flowchart showing the operation of the ninth embodiment.

Referring next to FIG. 13, the ninth embodiment will be described. This embodiment has a similar configuration to that of the eighth embodiment stated above, but the control method differs from the prior embodiment. FIG. 13 is the flowchart showing the operation of the ninth embodiment of the digital color copier.

When the user operates control panel 38 (Step S150) so as to select either the monochrome or color copy mode, all the mirrors begin to rotate. Then it is determined which mode, the monochrome or color copy mode has been selected (Step S151). It is checked whether the operation is in the monochrome mode (Step S152). If the operation is in the monochrome copy mode, CPU 34 controls the mirrors of laser beams of laser beam scanners 27a, 27b and 27c for forming yellow, magenta and cyan component images so as to retard or stop their drives (Step S153) and controls only the mirror for black so as to rotate it at the constant speed of rotation (Step S154). On the other hand, when the color copy mode has been selected, not only the mirror of laser beam scanner 27d for forming black component images but also all the mirrors of laser beam scanners 27a, 27b and 27c for forming yellow, magenta and cyan component images are controlled so as to rotate at the constant speed of rotation (Step S155). When the drives of the mirrors have reached the predetermined speed of rotation, the copying operation is started in the same manner as already stated in the above embodiments.

The effect of this embodiment is the same as that of the eighth embodiment so that the description will not be repeated.

Next, the tenth through fifteenth embodiments of the invention will be described with reference to FIGS. 14 through 18. The image processing circuit for the following embodiments is based on the block diagram shown in FIG. 2B.

(The 10th embodiment)

In the tenth embodiment, based on the judgment by CPU 34 as to laser recording status, LCU 32a stops or retards the rotations of the driving motors, one by one when laser recording has been completed. In this case, CPU 34 judges whether recording of each LSU is over from the recording status of LSU 27a, 27b, 27c and 27d.

Figure 14:
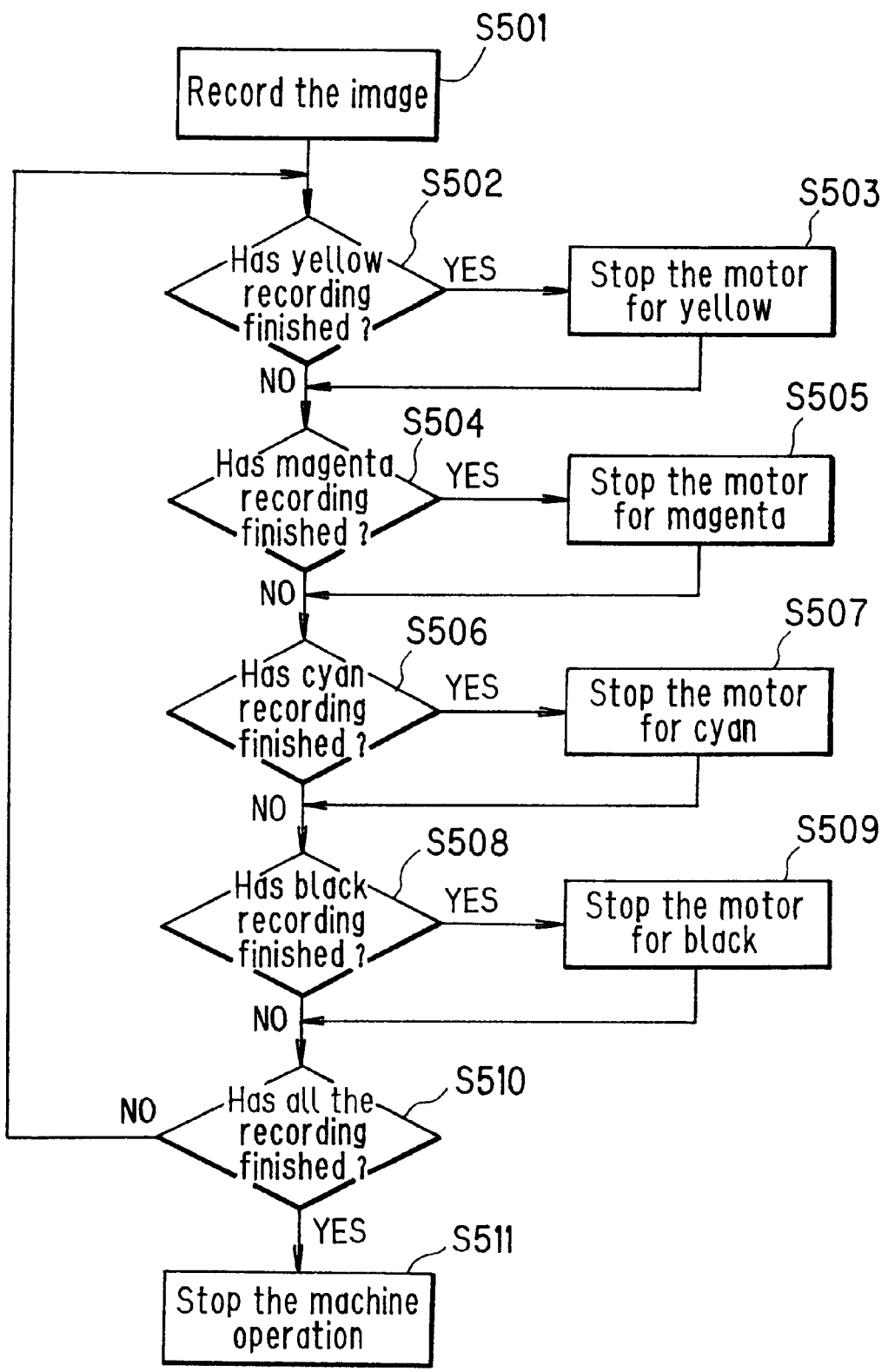
FIG. 14 is a flowchart showing the operation of the tenth embodiment of a digital color copier.

FIG. 14 is the flowchart showing the operation of the tenth embodiment of the color digital copier.

When an image recording command is input, LSUs 27a, 27b, 27c and 27d successively start recording on photoreceptor drums 22a, 22b, 22c and 22d in accordance with respective image signals (Step S501). Then CPU 34 judges whether LSU 27a has completed recording of yellow (Step S502). If not, CPU 34, at once, judges whether LSU 27b has completed recording of magenta (Step S504). If recording of yellow has finished, CPU 34 instructs LCU 32a to stop the driving motor for yellow of LSU 27a (Step S503) and then the operation goes to Step S504.

If the recording of magenta is not over, CPU 34, at once, judges whether LSU 27c has completed recording of cyan (Step S506). If recording of magenta has finished, CPU 34 instructs LCU 32a to stop the driving motor for magenta of LSU 27b (Step S505) and then the operation goes to Step S506.

If the recording of cyan is not over, CPU 34, at once, judges whether LSU 27d has completed recording of black (Step S508). If recording of cyan has finished, CPU 34 instructs LCU 32a to stop the driving motor for cyan of LSU 27c (Step S507) and then the operation goes to Step S508.

If the recording of black is not over, CPU 34, at once, judges whether recording of all the colors has been completed (Step S510). If the recording of black has finished, CPU 34 instructs LCU 32a to stop the driving motor for black of LSU 27d (Step S509) and then the operation goes to Step S510.

If all the recording is not over, the operation returns to Step S502 again and the same procedures as above will be repeated. When all the recording has been completed, which means the completion of a color image, then the operation of the machine is stopped (Step S511).

During the above recording operation, CPU 34 monitors the recording status of each color and controls so as to stop the drives of the driving motors of LSUs 27a to 27d, one by one as soon as their recording has been completed (in the order of their completion of recording).

In this way, since the drives of the driving motors of LSUs 27a to 27d are stopped or retarded one by one in the order in which they completed their laser recording of image information, this configuration is advantageous to the life of the motors, allowing the use of low-cost driving motors and hence making it possible to reduce the cost of LSUs 27a to 27d. It is also possible to reduce noise and wasted power consumption.

It should be of course noted that the judgment of the completion of recording is limited by the color order shown in FIG. 14. Further, instead of stopping the driving motors, it is also possible to control the motors so as to drive them at a lower speed of rotation in order to reduce the load on the motor bearings.

Recording time for each color in general differs from one to another. In such a case, the motors may stop in an order different from that of the arrangement of the laser beam scanners. These situations are the same in the following embodiments.

(The 11th embodiment)

In the eleventh embodiment, CPU 34 judges the laser recording status of LSUs 27a to 27d, and based on the judgment, LCU 32a stops or retards the rotations of the driving motors of LSUs 27a to 27c, one by one in the order in which they have completed their laser recording, while maintaining the rotation of the driving motor of LSU 27d even after completion of its laser recording, or controlling it so as to retard its rotation to the predetermined speed of rotation.

Figure 15:
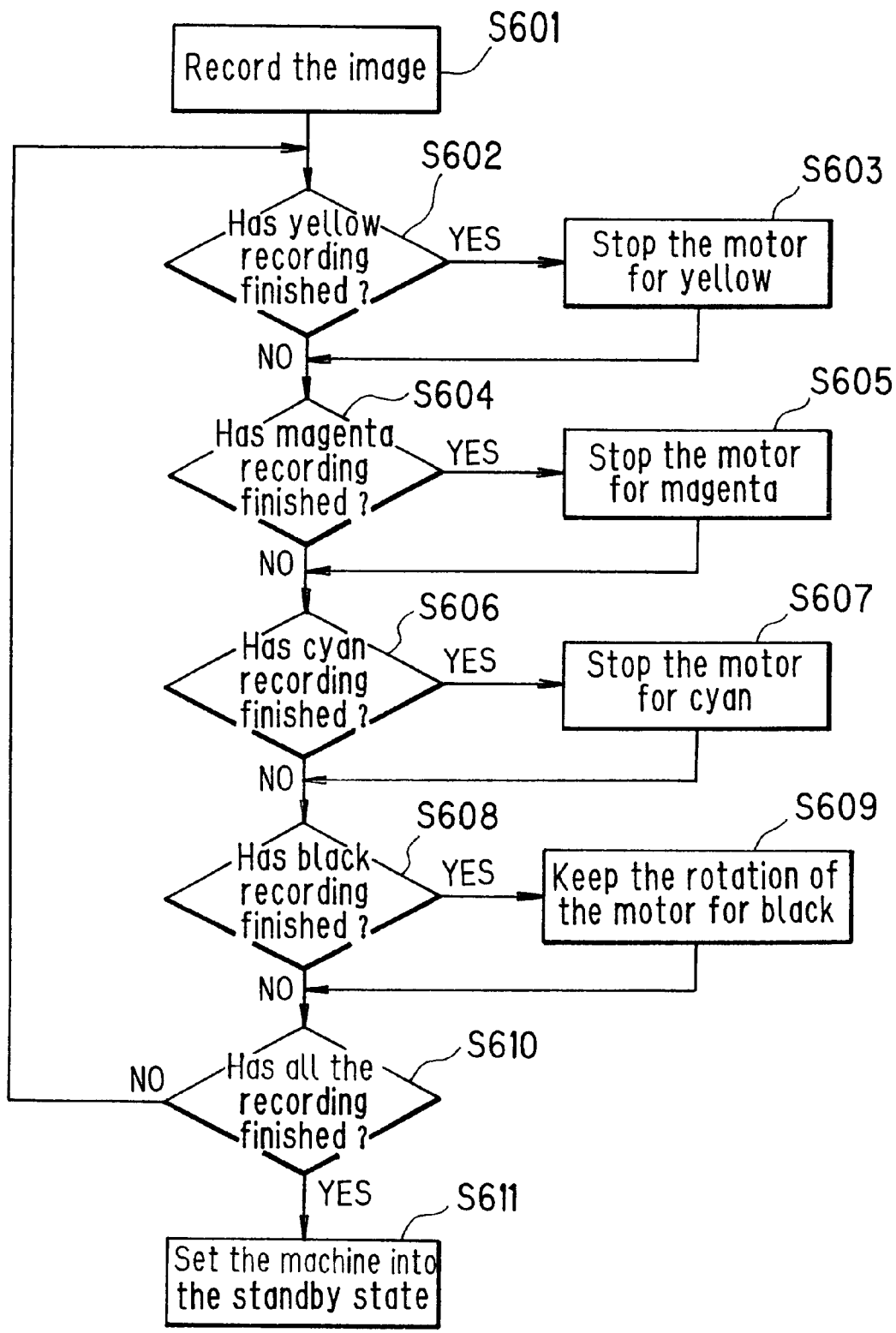
FIG. 15 is a flowchart showing the operation of the eleventh embodiment of a digital color copier.

FIG. 15 is the flowchart showing the operation of the eleventh embodiment of the color digital copier.

This embodiment concerns a color image forming apparatus in which one of the recording unit is selected as a particular recording unit. A configuration will be described in which LSU 27d as the recording unit for forming black images is selected as the particular recording unit. The same situation of course holds in the case where a recording unit for forming images of another color is selected as the particular one.

When an image recording command is input, LSUs 27a, 27b, 27c and 27d successively start recording on photoreceptor drums 22a, 22b, 22c and 22d in accordance with respective image signals (Step S601). Then CPU 34 judges whether LSU 27a has completed its recording of yellow (Step S602). If not, CPU 34, at once, judges whether LSU 27b has completed recording of magenta (Step S604). If recording of yellow has finished, CPU 34 instructs LCU 32a to stop the driving motor for yellow of LSU 27a (Step S603) and then the operation goes to Step S604.

When the recording of magenta is not over, CPU 34, at once, judges whether LSU 27c has completed recording of cyan (Step S606). If recording of magenta has finished, CPU 34 instructs LCU 32a to stop the driving motor for magenta of LSU 27b (Step S605) and then the operation goes to Step S606.

If the recording of cyan is not over, CPU 34, at once, judges whether LSU 27d has completed recording of black (Step S608). If recording of cyan has finished, CPU 34 instructs LCU 32a to stop the driving motor for cyan of LSU 27c (Step S607). Thereafter, even if the recording of black has been completed, CPU 34 keeps the driving motor for black rotating (Step S609). If the recording of black is not over, then it is judged whether recording of all the colors has been completed (Step S610). If not, the operation goes back to Step S602 again and the same procedures as above will be repeated. When all the recording has been completed, which means the completion of a color image, then the operation of the machine is set into the standby state (Step S611).

In this way, the drives of the driving motors of LSUs 27a to 27c are stopped or retarded one by one in the order in which they have completed their laser recording of image information while the driving motor of LSU 27d is kept on rotating or retarded to the predetermined speed of rotation. Thus, this configuration is advantageous to the life of the motors, allowing the use of low-cost driving motors, in particular, for LSUs 27a to 27c and hence making it possible to reduce the cost of LSUs 27a to 27c. It is also possible to reduce noise and wasted power consumption. Further, since this configuration is controlled so that the driving motor of LSU 27d for forming black images is kept rotating for preparation of a next copying operation, it is possible to reduce the acquisition time of the first copy in the mode in which one of the LSUs, e.g., LSU 27d is used in a particular way.

It is also possible to keep the motors of the recording units being driven at a lower speed of rotation than that during image forming for preparation of a next copying operation. It is of course possible to use the same control as above if the particular recording unit is any one of yellow, magenta or cyan.

(The 12th embodiment)

In the twelfth embodiment, CPU 34 judges the laser recording status of LSUs 27a to 27c as the recording section for color and that of LSU 27d as the recording section for black, separately. Based on this judgment, the drives of the driving motors of LSUs 27a to 27c for the color recording section are stopped or retarded to the predetermined speed of rotation prior to the control of the driving motor of LSU 27d for the monochrome section.

Figure 16:
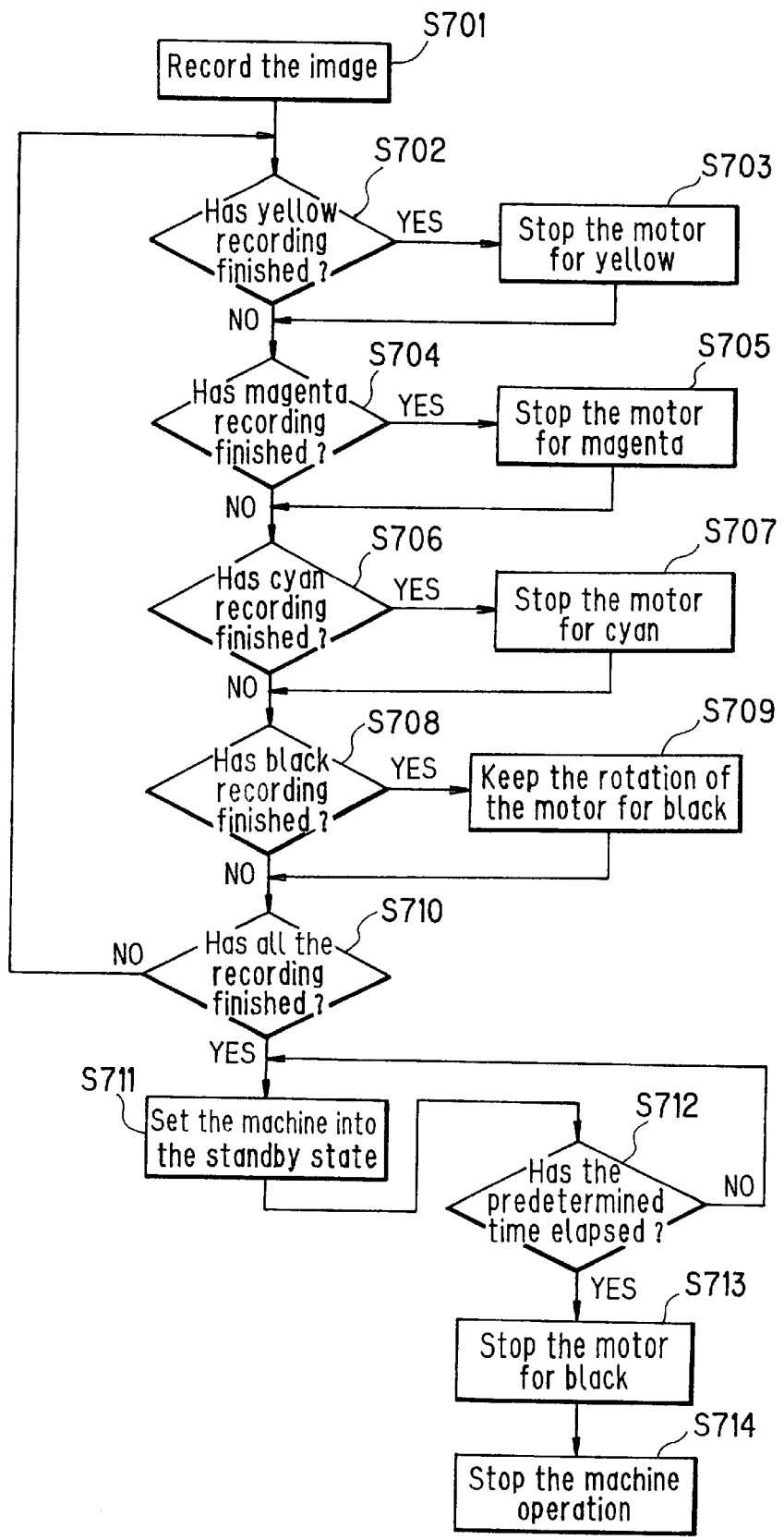
FIG. 16 is a flowchart showing the operation of the twelfth embodiment of a digital color copier.

FIG. 16 is the flowchart showing the operation of the twelfth embodiment.

When an image recording command is input, LSUs 27a, 27b, 27c and 27d successively start recording on photoreceptor drums 22a, 22b, 22c and 22d in accordance with respective image signals (Step S701). Then CPU 34 judges whether LSU 27a has completed recording of yellow (Step S702). If not, CPU 34, at once, judges whether LSU 27b has completed recording of magenta (Step S704). If recording of yellow has finished, the drive of the driving motor for yellow of LSU 27a is stopped (Step S703) and then the operation goes to Step S704.

If the recording of magenta is not over, CPU 34, at once, judges whether LSU 27c has completed recording of cyan (Step S706). If recording of magenta has finished, CPU 34 instructs LCU 32a to stop the driving motor for magenta of LSU 27b (Step S705) and then the operation goes to Step S706.

If the recording of cyan is not over, CPU 34, at once, judges whether LSU 27d has completed recording of black (Step S708). If recording of cyan has finished, CPU 34 instructs LCU 32a to stop the driving motor for cyan of LSU 27c (Step S707) and then the operation goes to Step S708.

Even if the recording of black has been completed, CPU 34 keeps the driving motor for black rotating (Step S709). If the recording of black is not over, then it is judged whether recording of all the colors has been completed (Step S710). If not, the operation goes back to Step S702 again and the same procedures as above will be repeated.

When it is judged at Step S710 that all the recording has been completed, the machine is set into the standby state (Step S711), and then it is judged whether the predetermined time has elapsed (Step S712). After a lapse of the predetermined time, the drive of the driving motor for black recording is stopped (Step S713) and the machine is set into the stationary state (Step S714).

In this way, in the configuration in which the driving motors of LSUs 27a to 27d are arranged in parallel to each other, the driving motors of LSUs 27a to 27c for color recording are stopped or retarded to the predetermined speed of rotation prior to the control of the driving motor of LSU 27d for monochrome recording. Accordingly, it is possible to avoid wasted driving of the driving motors of LSUs 27a to 27c for color recording, except the one for black recording. Therefore it becomes possible to use low cost driving motors for the motors other than the one for black recording. It is also possible to reduce noise and wasted power consumption.

(The 13th embodiment)

In the thirteenth embodiment, the drives of the driving motors of LSUs 27a to 27c for recording color images are controlled by the motor governor means between the first speed allowing for image recording and the stationary state. The drive of the driving motor of LSU 27d for recording monochrome images is controlled by the motor governor means between the first speed allowing for image recording, the second speed for standby state and the stationary state.

Figure 17:
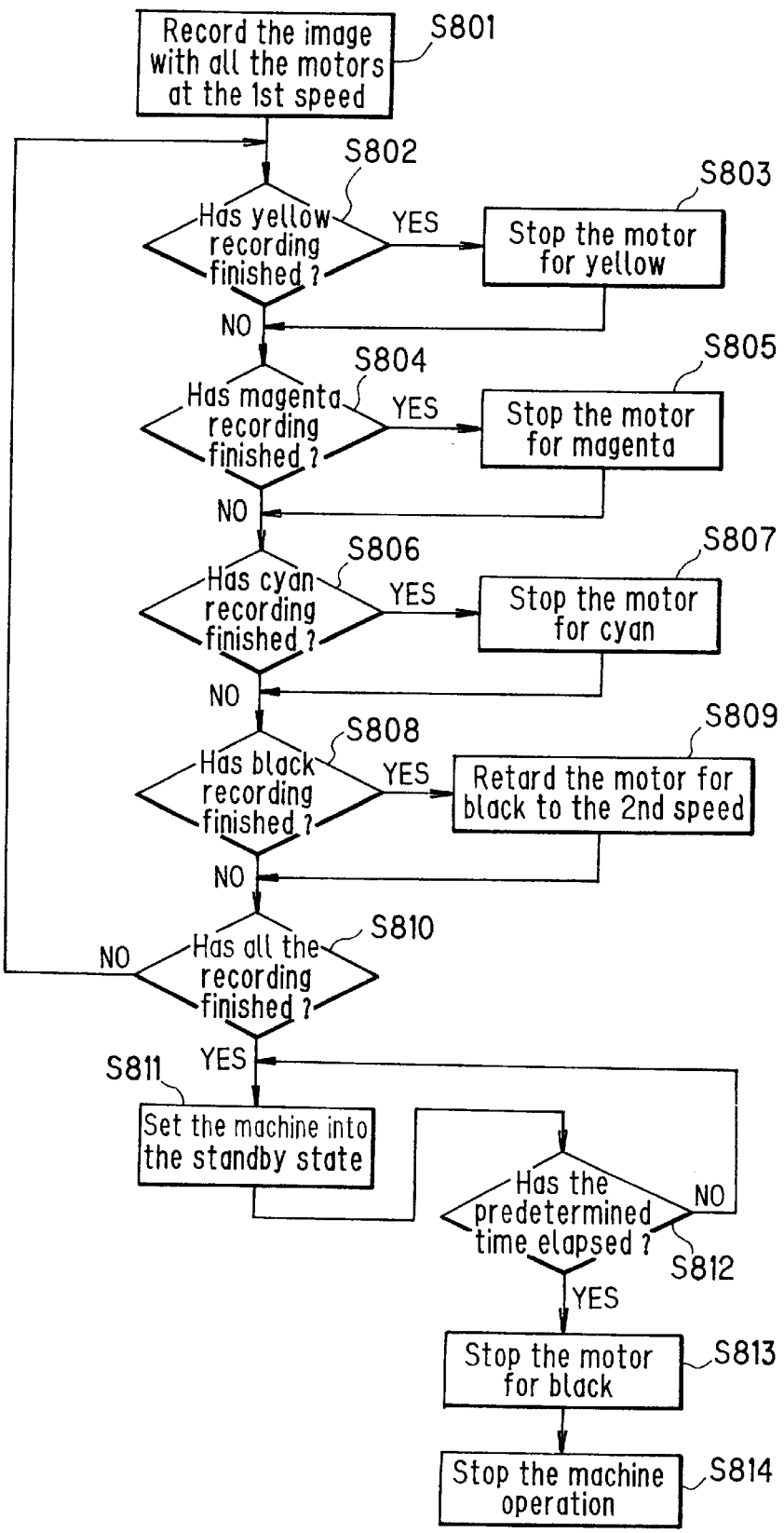
FIG. 17 is a flowchart showing the operation of the thirteenth embodiment of a digital color copier.

FIG. 17 is the flowchart showing the operation of the thirteenth embodiment.

When an image recording command is input, all the motors of LSUs 27a, 27b, 27c and 27d rotate at the first speed so as to start image recording (Step S801). Then CPU 34 judges whether LSU 27a has completed recording of yellow (Step S802). If not, CPU 34, at once, judges whether LSU 27b has completed recording of magenta (Step S804). If recording of yellow has finished, CPU 34 instructs LCU 32a to stop the drive of the driving motor for yellow of LSU 27a (Step S803) and then the operation goes to Step S804.

If the recording of magenta is not over, CPU 34, at once, judges whether LSU 27c has completed recording of cyan (Step S806). If recording of magenta has finished, CPU 34 instructs LCU 32a to stop the driving motor for magenta of LSU 27b (Step S805) and then the operation goes to Step S806.

If the recording of cyan is not over, CPU 34, at once, judges whether LSU 27d has completed recording of black (Step S808). If recording of cyan has finished, CPU 34 instructs LCU 32a to stop the driving motor for cyan of LSU 27c (Step S807) and then the operation goes to Step S808.

If the recording of black has been completed, the drive of the driving motor of LSU 27d is retarded to the second speed (Step S809). If the recording of black is not over, then it is further judged whether recording of all the colors has been completed (Step S810). If not, the operation goes back to Step S802 again and the same procedures as above will be repeated.

When it is judged at Step S810 that the operation has been completed, the machine is set into the standby state (Step S811), and then it is judged whether the predetermined time has elapsed (Step S812). After a lapse of the predetermined time, the drive of the driving motor for black recording is stopped (Step S813) and the machine is set into the stationary state (Step S814).

In this way, in the configuration in which the driving motors of LSUs 27a to 27d are arranged in parallel to each other, the drives of the driving motors of LSUs 27a to 27c for color recording are controlled between the first speed allowing for image recording and the stationary state while the drive of the driving motor of LSU 27d of the monochrome recording section is controlled between the first speed allowing for image recording, the second speed for standby and the stationary state. Accordingly, it is possible to avoid wasted driving of the driving motors of LSUs 27a to 27c for color recording, except the one for black recording. Therefore it becomes possible to use low cost driving motors for the motors other than the one for black recording. It is also possible to reduce noise and wasted power consumption. Moreover, it is possible to reduce the acquisition time of the first copy in the copy mode in which only LSU 27d for black recording is used.

(The 14th embodiment)

In the fourteenth embodiment, the drives of the driving motors of LSUs 27a to 27c for color recording color are controlled by the motor governor means between the first speed allowing for color image recording and the stationary state. The drive of the driving motor of LSU 27d for recording monochrome images is controlled by the motor governor means between the first speed allowing for image recording and for standby state, the second speed allowing for recording of monochrome images and the stationary state.

FIG. 18 is the flowchart showing the operation of the fourteenth embodiment.

When an image recording command is input, CPU 34 judges whether the operation is in the color mode or not (Step S901), if it is in the monochrome mode, the driving motor of LSU 27*d* for black recording is driven at the second speed to perform recording of the image (Step S902). After completion of the black recording (Step S903), the driving motor for black recording is driven at the first speed (Step S904) so that the machine is set into the standby state (Step 915). After a lapse of the predetermined time (Step S916), the drive of the driving motor of LSU 27*d* for black recording is stopped (Step S917) so that the machine is set into the stationary state (Step S918).

On the other hand, when it has been determined at Step S901 that the operation is in the color mode, all the motors rotate at the first speed so as to start image recording (Step S905). Then CPU 34 judges whether LSU 27*a* has completed recording of yellow (Step S906). If not, CPU 34, at once, judges whether LSU 27*b* has completed recording of magenta (Step S908). If recording of yellow has finished, the drive of the driving motor for yellow of LSU 27*a* is stopped (Step S907) and then the operation goes to Step S908.

If the recording of magenta is not over, CPU 34, at once, judges whether LSU 27*c* has completed recording of cyan (Step S910). If recording of magenta has finished, CPU 34 instructs LCU 32*a* to stop the driving motor for magenta of LSU 27*b* (Step S909) and then the operation goes to Step S910.

If the recording of cyan is not over, CPU 34, at once, judges whether LSU 27*d* has completed recording of black (Step S912). If recording of cyan has finished, the driving motor for cyan of LSU 27*c* is stopped (Step S911) and then the operation goes to Step S912. If the recording of black has been completed, the driving motor of LSU 27*d* is kept rotating at the first speed (Step S913). If the recording of black is not over, then it is further judged whether recording of all the colors has been completed (Step S914). If not, the operation goes back to Step S906 again and the same procedures as above will be repeated.

When it is judged at Step S914 that the operation has been completed, the machine is set into the standby state (Step S915), and then it is judged whether the predetermined time has elapsed (Step S916). After a lapse of the predetermined time, the drive of the driving motor for black recording is stopped (Step S917) and the machine is set into the stationary state (Step S918).

In this way, in the configuration in which the driving motors of LSUs 27*a* to 27*d* are arranged in parallel to each other, the drive of the driving motor of LSU 27*d* for the monochrome recording section is controlled between the first speed allowing for recording of monochrome images, the second speed allowing for recording of color images and the stationary state. Further, the drives of the driving motors of LSUs 27*a* to 27*c* for the color recording section are controlled between the first speed allowing for color image recording and the stationary state. During color recording, the driving motor of LSU 27*d* of the monochrome recording section is driven at the second speed for standby. Accordingly, it is possible to avoid wasted driving of the driving motors of LSUs 27*a* to 27*c* for color recording, not including the one for black recording. Therefore it becomes possible to use low cost driving motors for the motors other than the one for black recording. It is also possible to reduce noise and wasted power consumption. Moreover, it is possible to reduce the acquisition time of the first copy in the copy mode in which only LSU 27*d* for black recording is used.

(The 15th embodiment)

Next, the fifteenth embodiment will be described. This embodiment is the same as the fourteenth embodiment in which the first speed is set slower than the second speed. Since LSU 27*d* for the recording section for forming black images is kept rotating at the first speed during standby state, in this configuration the first speed is designed to be slower than the second speed.

Thus, the drive of the driving motor of LSU 27*d* for the monochrome recording section is controlled by LCU 32*a* between the first speed allowing for recording of color images, the second speed allowing for recording of monochrome images and the stationary state. Further, the drives of the driving motors of LSUs 27*a* to 27*c* for the color recording section are controlled between the first speed allowing for color image recording and the stationary state while the driving motor of the monochrome recording section is driven at the first speed for standby. In this way, the configuration in which the first speed is slower than the second speed makes it possible to avoid low-speed driving and wasted driving of the driving motors of LSUs 27*a* to 27*c* for color recording, with the one for black recording excluded. Therefore it becomes possible to use low cost driving motors for the motors other than the one for black recording. It is also possible to reduce noise and wasted power consumption. Moreover, it is possible to reduce the acquisition time of the first copy in the copy mode in which only LSU 27*d* for black recording is used, and hence markedly improve the usability of the monochrome copy mode which records at a higher rate and is used more frequently.

In accordance with the first feature of the invention, since the drives of the driving motors in the laser scanner units are controlled in accordance with the type of the input image, the features of the image, i.e., original, etc., are automatically extracted from the input image data captured by the input device such as a scanner, so that only the motor or motors in the laser scanner units required for forming the image are driven, this thereby makes it possible to make the copier ready within a short time. Therefore, the first-copy acquisition time can be shortened and also it is possible to avoid unnecessary driving of the motors in the laser scanner units which will not be engaged in recording the input image. Thus, reduction of the life of the motors and/or problems of noise and wasted power consumption can be prevented.

In accordance with the second feature of the invention, in the state where all the driving motors in the laser recording devices arranged in parallel to each other are rotating, if the original is judged to be of a monochrome type, the motors in the laser scanner units for color will be stopped or retarded. Accordingly, it is possible to avoid unnecessary driving of the motors in the color laser scanner units which will not be engaged in recording the image and hence reduction of the life of the motors and/or problems of noise and wasted power consumption can be prevented.

In accordance with the third feature of the invention, in the state where all the driving motors in the laser recording devices arranged in parallel to each other are in the static state, if the original is judged to be of a monochrome type, the driving motors other than those in the color laser scanners will be activated. Thus, only the driving motor of the monochrome recording section required for recording the image will be activated with the driving motors for color laser scanners kept static, so that it is possible to prevent reduction of the life of the motors and/or problems of noise and wasted power consumption.

In accordance with the fourth feature of the invention, the mode in which the apparatus has been used most frequently is taken into account and when the machine is activated, the driving motor or motors are started to rotate so that recording can be implemented in the most frequently used mode. Accordingly, when a copying operation is made in a mode coinciding with the most frequently used processing mode this configuration is advantageous in reducing the waiting time before recording.

In accordance with the fifth feature of the invention, the modes in which the apparatus has been used in the last predetermined number of operations, for example, in the recent several times of operation, are taken into account. When the machine is operated, the driving motors are driven in the processing mode which has recently been used most frequently. Accordingly, the probability that the operation is performed in the most frequently used mode within the recent operations is high, so that this configuration is effective in reducing the waiting time before recording when an image is formed in the same processing mode.

In accordance with the sixth and seventh features of the invention, since the mode manger means is provided to control the usage frequencies of the processing modes for each of a plurality of image information input devices, it is possible to control the apparatus in such a manner that the driving motor or motors which are likely to be used will be driven. Therefore, this configuration is effective in reducing the waiting time before image forming.

In accordance with the eighth feature of the invention, since the driving motor or motors other than color laser scanners are driven, this configuration is effective in reducing the waiting time before recording when recording is performed in the monochrome recording mode which is most likely to be used, as well as in reducing noise.

In accordance with the ninth feature of the invention, since the drives of the motors are controlled in accordance with the processing mode selected through the selector means by the user, only the motor or motors in the laser scanners required for the selected image forming are controlled so as to rotate at the predetermined speed. Accordingly, it is possible not only to reduce the waiting time, but also prevent wasted driving of the driving motors. Hence, it is possible to prevent reduction of the life of the motors and/or problems of noise and wasted power consumption.

In accordance with the tenth feature of the invention, when the monochrome mode is set by the selector means, the driving motors in the laser scanners for color are stopped, so that it is possible to prevent waste driving of the motors in the laser scanners for color which are not required for the image recording in that mode. Thus, it is possible to extend the life of the motors as well as reduce noise and power consumption.

In accordance with the eleventh feature of the invention, the driving motors of the laser scanners are stopped or retarded one by one right after laser recording of image information in each laser scanner has been completed. Thus, this configuration is advantageous to the life of the motors, allowing the use of low-cost driving motors and hence making it possible to reduce the cost of the laser scanners. It is also possible to reduce noise and wasted power consumption.

In accordance with the twelfth feature of the invention, the driving motors of the laser scanners are stopped or retarded one by one right after laser recording of image information in each laser scanner has been completed and the driving motor in the particular laser scanner is kept rotating or retarded to the predetermined speed of rotation. Thus, this configuration is advantageous to the life of the motors. Particularly, it is possible to use low cost driving motors for the driving motors other than that of the particular laser scanner and hence reduce the cost of the laser scanners other than the particular one. Further, it is also possible to reduce noise and wasted power consumption.

It is further possible to reduce the acquisition time of the first copy in the copy mode in which only the particular laser scanner is used.

In accordance with the thirteenth feature of the invention, of the driving motors in the laser scanner units of the recording sections arranged in parallel to each other, the driving motors for color recording are stopped or retarded to the predetermined speed of rotation prior to the control of the driving motor for monochrome recording. Accordingly, it is possible to avoid wasted driving of the driving motors in the laser scanners in the color recording section, hence enabling use of low cost driving motors for the more numerous motors. Further, it is also possible to reduce noise and wasted power consumption.

In accordance with the fourteenth feature of the invention, in the configuration in which multiple laser scanners are arranged in parallel to each other, the drives of the driving motors for color recording are controlled between the first speed allowing for image recording and the stationary state while the drive of the driving motor in the monochrome recording section is controlled between the first speed allowing for image recording, the second speed for standby and the stationary state. Accordingly, it is possible to avoid wasted driving of the driving motors in the laser scanner units of the color recording section. Therefore it becomes possible to use low cost driving motors for the more numerous motors. It is also possible to reduce noise and wasted power consumption. Moreover, it is possible to reduce the acquisition time of the first copy in the copy mode in which only the laser scanner unit for black recording is used.

In accordance with the fifteenth and sixteenth features of the invention, in the configuration in which multiple laser scanners are arranged in parallel to each other, the drive of the driving motor in the monochrome recording section is controlled between the first speed for recording of color images and for standby, the second speed for recording of monochrome images and the stationary state. The drive of the driving motors for the color recording section is controlled between the first speed allowing for color image recording and the stationary state. As a result, during color recording, the driving motor in the monochrome recording section is also driven at the first speed whereas during monochrome recording only the driving motor in the monochrome recording section is driven at the second speed. During the waiting state, only the driving motor of the monochrome recording section is driven at the first speed while the driving motors unrelated to the recording are made static. Thus, it is possible to avoid wasted driving of the driving motors in the laser scanner units of the color recording section for color recording, and hence it becomes possible to use low cost driving motors for the motors in the color recording section. Further, it is also possible to reduce noise and wasted power consumption. Moreover, it is possible to reduce the acquisition time of the first copy in the copy mode in which only the laser scanner in the monochrome recording section is used.

In particular, the sixteenth feature of the invention is configured in the fifteenth configuration in which the first speed is slower than the second speed. Accordingly, since the recording speed in the monochrome copy mode, which is used more frequently, is higher, the usability can be sharply improved.

What is claimed is:

1. A color image forming apparatus comprising:

an image information input means for inputting image information;

a laser recording means having a plurality of laser scanner units for component colors of images, arranged in parallel with each other, each scanner unit including a laser, a rotational polygonal mirror and a driving motor for driving the rotational polygonal mirror;

a laser scanner control means for governing the drives of the driving motors for performing laser scanning in accordance with the image information;

an image forming means having a plurality of image forming units for component colors, for forming images, arranged in parallel with each other, each image forming unit forming an image from the latent image recorded on the photoreceptor by the corresponding laser scanner unit; and a laser recording status determining means for determining the recording status of the laser recording means onto the photoreceptors;

wherein the laser scan control means, based on determinations by the laser recording status determining means, stops or retards the drives of the driving motors, one by one when laser recording has been completed.

2. A color image forming apparatus comprising:

an image information input means for inputting image information;

a laser recording means having a plurality of laser scanner units for component colors of images, arranged in parallel with each other, each scanner unit including a laser, a rotational polygonal mirror and a driving motor for driving the rotational polygonal mirror;

a laser scanner control means for governing the drives of the driving motors for performing laser scanning in accordance with the image information;

an image forming means having a plurality of image forming units for component colors, for forming images, arranged in parallel with each other, each image forming unit forming an image from the latent image recorded on the photoreceptor by the corresponding laser scanner unit; and a laser recording status determining means for determining the recording status of the laser recording means onto the photoreceptors, wherein the laser scanner units are grouped into two sections the first laser scanner section and the second laser scanner section; and the laser scan control means controls the first and second laser scanner sections, based on determinations by the laser recording status determining means, so that the drives of the driving motors in the first laser scanner section are stopped or retarded, one by one, when laser recording has been completed and so that the operational driving of the drive of the driving motor in the second laser scanner section is maintained or is retarded after laser recording has been completed.

3. A color image forming apparatus comprising:

an image information input means for inputting image information;

a laser recording means having a plurality of laser scanner units for component colors of images, arranged in parallel with each other, each scanner unit including a laser, a rotational polygonal mirror and a driving motor for driving the rotational polygonal mirror;

a laser scanner control means for governing the drives of the driving motors for performing laser scanning in accordance with the image information;

an image forming means having a plurality of image forming units for component colors, for forming images, arranged in parallel with each other, each image forming unit forming an image from the latent image recorded on the photoreceptor by the corresponding laser scanner unit; and a laser recording status determining means for determining the recording status of the laser recording means onto the photoreceptors, wherein the laser recording means and the image forming means constitute a color recording section for recording color images and a monochrome recording section for recording monochrome images; the laser status determining means determines the recording status of the color recording section and the recording status of the monochrome recording section, separately; and the laser scan control means, based on determinations by the laser status determining means, stops the drives of the driving motors in the laser scanner units in the color recording section or retards the drives thereof, prior to the control of the drive of the driving motor of the laser scanner unit in the monochrome recording section.

4. A color image forming apparatus comprising:

an image information input means for inputting image information;

a laser recording means having a plurality of laser scanner units for component colors of images, arranged in parallel with each other, each scanner unit including a laser, a rotational polygonal mirror and a driving motor for driving the rotational polygonal mirror;

a laser scanner control means for governing the drives of the driving motors for performing laser scanning in accordance with the image information; and an image forming means having a plurality of image forming units for component colors, for forming images, arranged in parallel with each other, each image forming unit forming an image from the latent image recorded on the photoreceptor by the corresponding laser scanner unit, wherein the laser recording means and the image forming means constitute a color recording section for recording color images and a monochrome recording section for recording monochrome images; and the laser scan control means controls the drives of the driving motors in the laser scanner units in the color recording section, between speeds allowing for image recording and a stationary state, and controls the drive of the driving motor in the laser scanner unit in the monochrome recording section, between a first speed allowing for image recording, a second speed for standby and a stationary state.

5. A color image forming apparatus comprising:

an image information input means for inputting image information;

a laser recording means having a plurality of laser scanner units for component colors of images, arranged in parallel with each other, each scanner unit including a laser, a rotational polygonal mirror and a driving motor for driving the rotational polygonal mirror;

a laser scanner control means for governing the drives of the driving motors for performing laser scanning in accordance with the image information; and an image forming means having a plurality of image forming units for component colors, for forming images, arranged in parallel with each other, each image forming unit forming an image from the latent image recorded on the photoreceptor by the corresponding laser scanner unit, wherein the laser recording means and the image forming means constitute a color recording section for recording color images and a monochrome recording section for recording monochrome images; and the laser scan control means controls the drives of the driving motors in the laser scanner units in the color recording section, between a speed allowing for image recording and a stationary state, and controls the drive of the driving motor in the laser scanner unit in the monochrome recording section, between a first speed allowing for recording of color images and for standby, a second speed allowing for monochrome recording and a stationary state.

6. The color image forming apparatus according to claim 5, wherein, as to the driving motor of the laser scanner unit in the monochrome recording section, the first speed is slower than the second speed.

* * * * *